United States Patent
Townson et al.

(10) Patent No.: US 9,321,495 B2
(45) Date of Patent: Apr. 26, 2016

(54) METHOD OF ASSEMBLING A FRONT END ASSEMBLY OF A VEHICLE

(71) Applicant: GM GLOBAL TECHNOLOGY OPERATIONS LLC, Detroit, MI (US)

(72) Inventors: James M. Townson, Clarkston, MI (US); Mark L. Felzien, Rochester Hills, MI (US); Alexander C. Winter, Northville, MI (US); David R. Galloway, Davisburg, MI (US); Arthur M. Melander, Clinton Township, MI (US); Christopher C. Cook, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 405 days.

(21) Appl. No.: 13/741,505

(22) Filed: Jan. 15, 2013

(65) Prior Publication Data

US 2014/0059859 A1    Mar. 6, 2014

Related U.S. Application Data

(60) Provisional application No. 61/695,695, filed on Aug. 31, 2012.

(51) Int. Cl.
*B62D 65/00* (2006.01)
*B62D 65/02* (2006.01)
(Continued)

(52) U.S. Cl.
CPC ............. *B62D 65/02* (2013.01); *B62D 25/085* (2013.01); *B62D 25/163* (2013.01); *B62D 65/04* (2013.01); *Y10T 29/49622* (2015.01)

(58) Field of Classification Search
CPC ...... B62D 65/02; B62D 65/04; B62D 25/163; B62D 25/085; Y10T 29/49622
See application file for complete search history.

(56) References Cited

U.S. PATENT DOCUMENTS 2,234,781 A * 3/1941 Schjolin ................. 296/198
4,428,447 A   1/1984 Malen
(Continued)

FOREIGN PATENT DOCUMENTS

CN    202345778 U    7/2012
DE    19746046 A1    4/1998
(Continued)

OTHER PUBLICATIONS

Office Action regarding related CN App. No. 201310391491.2; dated Jun. 30, 2015; 8 pgs.

*Primary Examiner* — Richard Chang
(74) *Attorney, Agent, or Firm* — Cantor Colburn LLP

(57) ABSTRACT

A method of assembling a front end assembly of a vehicle is provided. The method includes integrally forming a positioning and reinforcement structure having a relatively rectilinear configuration comprising a top support member, a bottom support member, a first side member and a second side member. The method also includes detachably coupling a first wing structure to the first side member. The method further includes operably mounting a first fender assembly to a first side flange of the first wing structure. The method yet further includes operably coupling a centering bracket proximate the top support member. The method also includes locating and centering the positioning and reinforcement structure to a hood with the centering bracket. The method further includes fixedly securing the positioning and reinforcement structure to a radiator support disposed rearwardly of the positioning and reinforcement structure.

10 Claims, 25 Drawing Sheets

(51) Int. Cl.
*B62D 25/08* (2006.01)
*B62D 25/16* (2006.01)
*B62D 65/04* (2006.01)

(56) References Cited

U.S. PATENT DOCUMENTS

| | | |
|---|---|---|
| 6,196,624 B1 | 3/2001 | Bierjon et al. |
| 6,450,276 B1 | 9/2002 | Latcau |
| 7,497,289 B2 | 3/2009 | Kwun et al. |
| 7,571,957 B2 | 8/2009 | Povinelli et al. |
| 8,746,783 B2 | 6/2014 | Townson et al. |
| 2003/0214154 A1 | 11/2003 | Tarahomi |
| 2005/0088015 A1 | 4/2005 | Kishikawa et al. |
| 2005/0253419 A1 | 11/2005 | Kwon |
| 2006/0156547 A1 | 7/2006 | Tarahomi |
| 2008/0185872 A1 | 8/2008 | Povinelli et al. |
| 2010/0163324 A1 | 7/2010 | Jyoutaki et al. |

FOREIGN PATENT DOCUMENTS

| | | |
|---|---|---|
| KR | 20070100017 A | 10/2007 |
| WO | 2012067059 A1 | 5/2012 |

\* cited by examiner

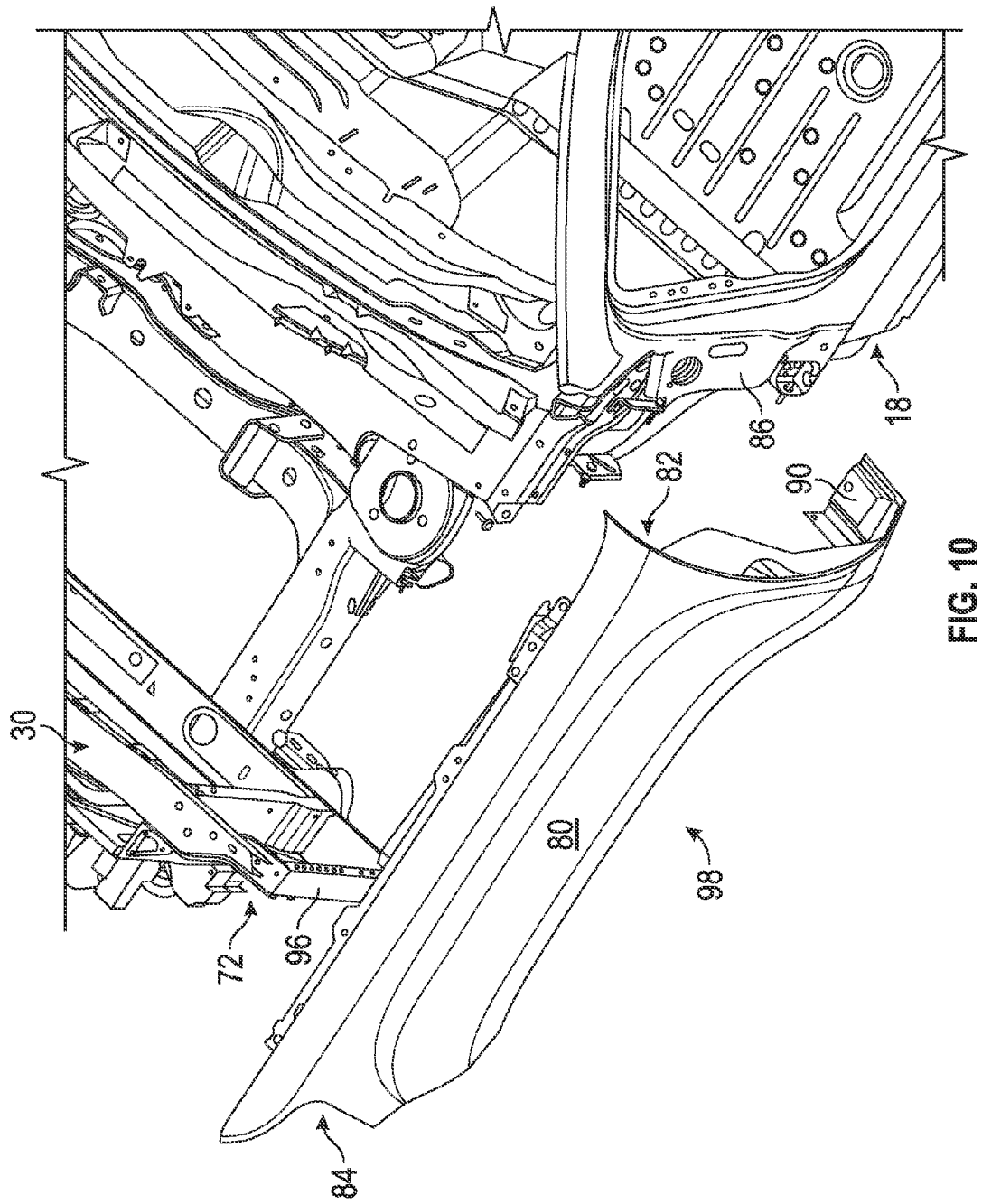

METHOD OF ASSEMBLING A FRONT END ASSEMBLY OF A VEHICLE

CROSS-REFERENCE TO RELATED APPLICATION

This application claims the benefit of U.S. Provisional Application Ser. No. 61/695,695 filed on Aug. 31, 2012, which is hereby incorporated herein by reference in its entirety.

FIELD OF THE INVENTION

The subject invention relates to vehicles, and more particularly to methods of assembling a vehicle, as well as sub-assemblies of the vehicle.

BACKGROUND

Vehicles, such as automobiles, are assembled by aligning and fastening numerous components and sub-assemblies to one another. One region of the automobile requiring assembly of such components and sub-assemblies is a front end region, sometimes referred to as a "front clip." The front clip is commonly defined as the region of the vehicle extending from the A-pillar to the most forwardly disposed component, typically a front bumper. The front clip includes a structural frame, as well as a variety of components that collectively form a body.

Efforts to directly or indirectly mount and/or fix the body components of the front clip to each other without the use of a structural frame, as well as to the vehicle frame have included approaches which rely on machined body mounting locations for the body components. Approaches relying on such body mounting locations have undesirably led to large variations in alignment and fastening of components to each other. Numerous issues related to large variations may influence the aesthetic appearance of the automobile and may be the cause of functional deficiencies, such as opening/closing efforts, alignment and mutilation, to name a few, which each may affect consumer satisfaction.

SUMMARY OF THE INVENTION

In one exemplary embodiment of the invention, a method of assembling a front end assembly of a vehicle is provided. The method includes integrally forming a positioning and reinforcement structure having a relatively rectilinear configuration comprising a top support member, a bottom support member, a first side member and a second side member. The method also includes detachably coupling a first wing structure to the first side member. The method further includes operably mounting a first fender assembly to a first side flange of the first wing structure. The method yet further includes operably coupling a centering bracket proximate the top support member. The method also includes locating and centering the positioning and reinforcement structure to a hood with the centering bracket. The method further includes fixedly securing the positioning and reinforcement structure to a radiator support disposed rearwardly of the positioning and reinforcement structure.

In another exemplary embodiment of the invention, a method of assembling a vehicle is provided. The method includes aligning and mounting an aft end of a fender assembly proximate a rear portion of the vehicle. The method also includes operably coupling a positioning and reinforcement structure to a radiator support, the positioning and reinforcement structure comprising a relatively rectilinear structure comprising a top support member, a bottom support member, a first side member, a second side member and a first wing structure detachably coupled to the first side member. The method further includes operably mounting a forward end of the fender assembly to the first wing structure. The method yet further includes fixedly securing the radiator support to a frame of the vehicle. The method includes locating and centering the positioning and reinforcement structure to a hood with a centering bracket. The method further includes fixedly securing the positioning and reinforcement structure to a radiator support disposed rearwardly of the positioning and reinforcement structure.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 10 is a top, rear perspective view of a fender assembly prior to installation to the vehicle;

DESCRIPTION OF THE EMBODIMENTS

Figure 1:
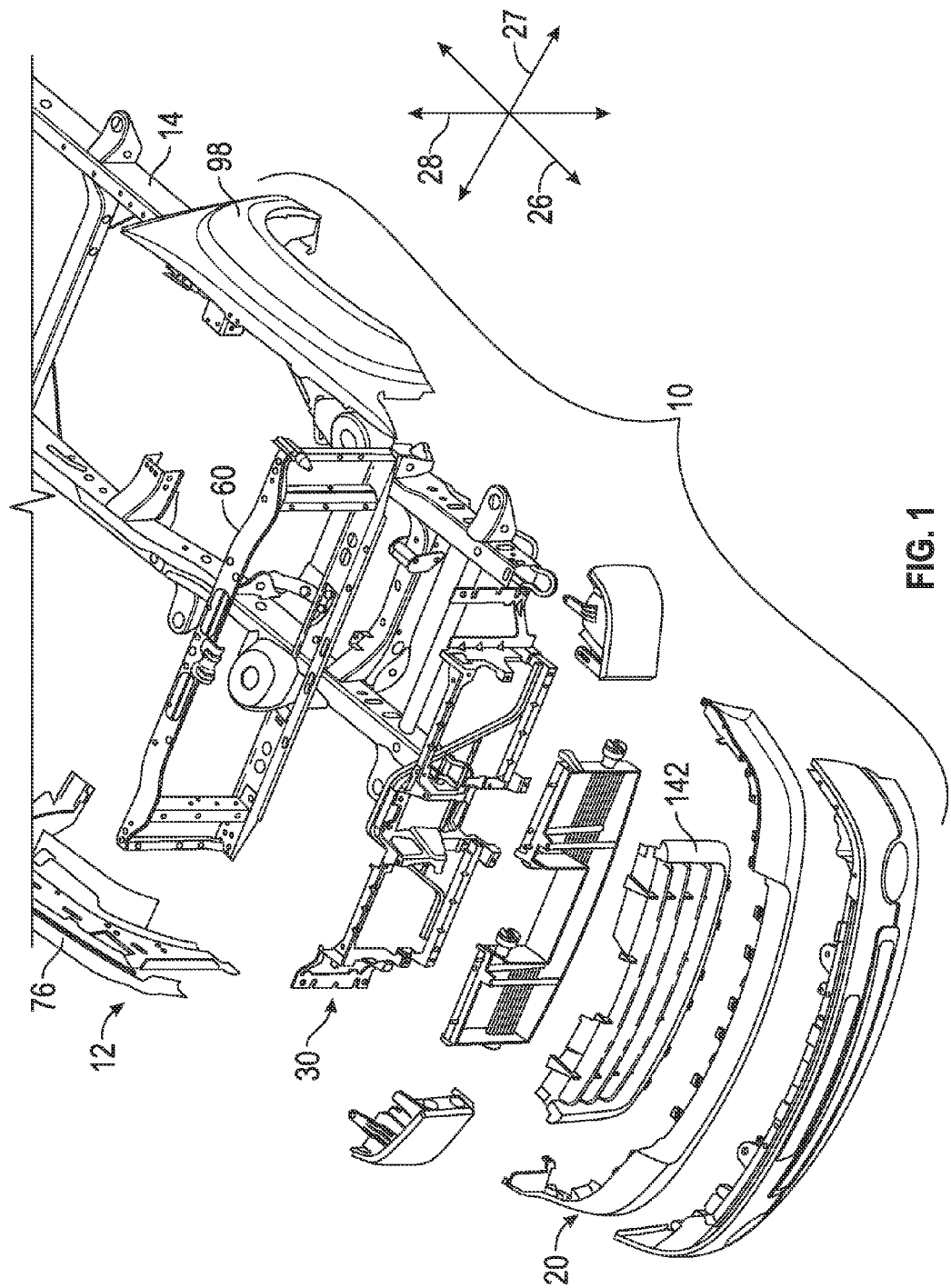
FIG. 1 is a simplified, partially disassembled perspective view of a front end assembly of a vehicle.

The following description is merely exemplary in nature and is not intended to limit the present disclosure, its application or uses. It should be understood that throughout the drawings, corresponding reference numerals indicate like or corresponding parts and features.

Figure 2:
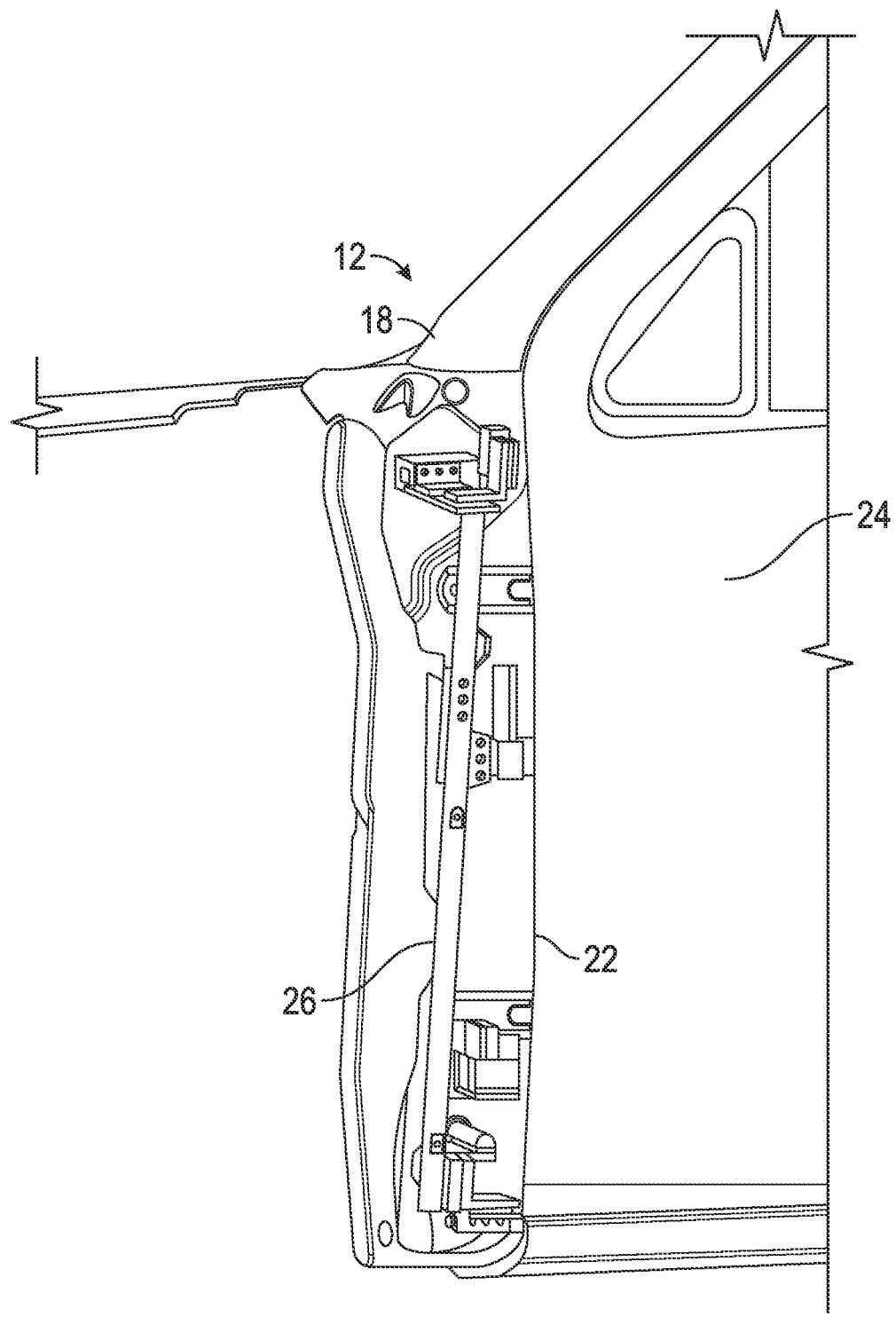
FIG. 2 is a side elevational view of a region proximate an A-pillar of the vehicle.
Figure 3:
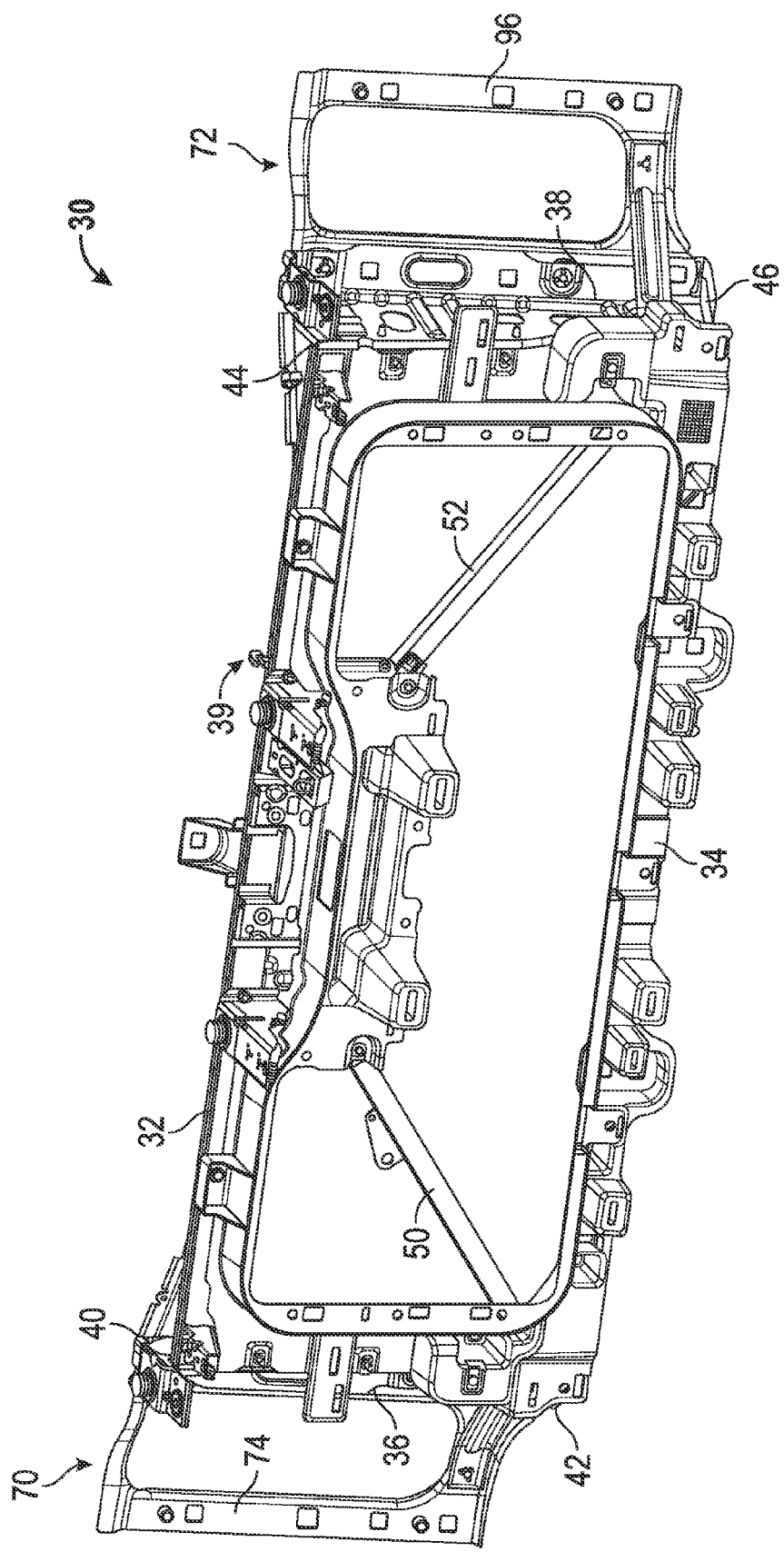
FIG. 3 is a perspective view of a positioning and reinforcement structure of the front end assembly.
Figure 4:
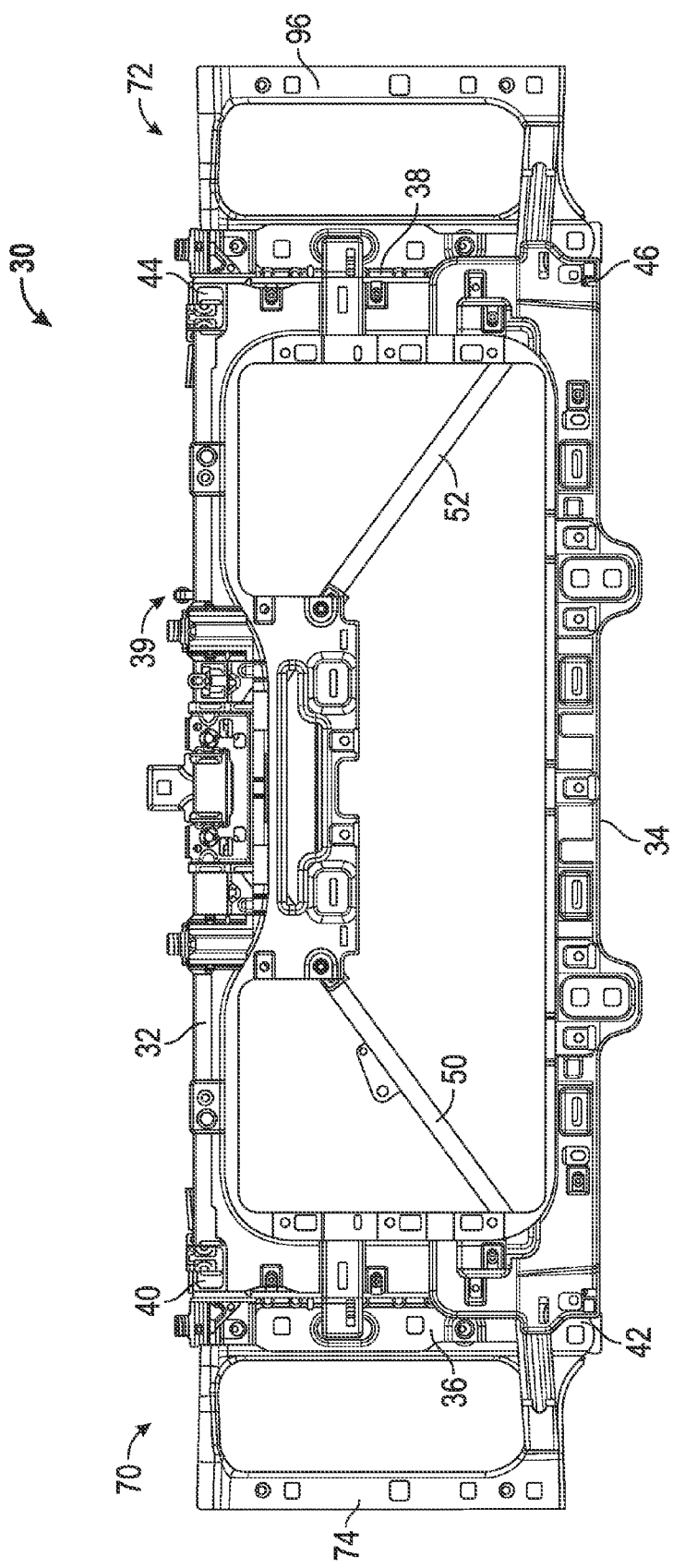
FIG. 4 is a front elevational view of the positioning and reinforcement structure.
Figure 5:
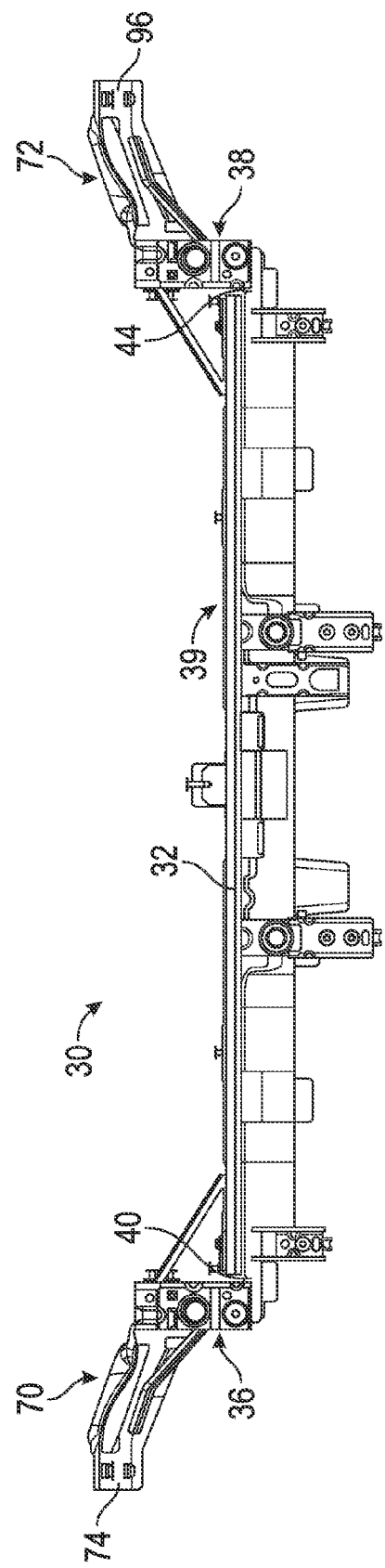
FIG. 5 is a top plan view of the positioning and reinforcement structure.
Figure 6:
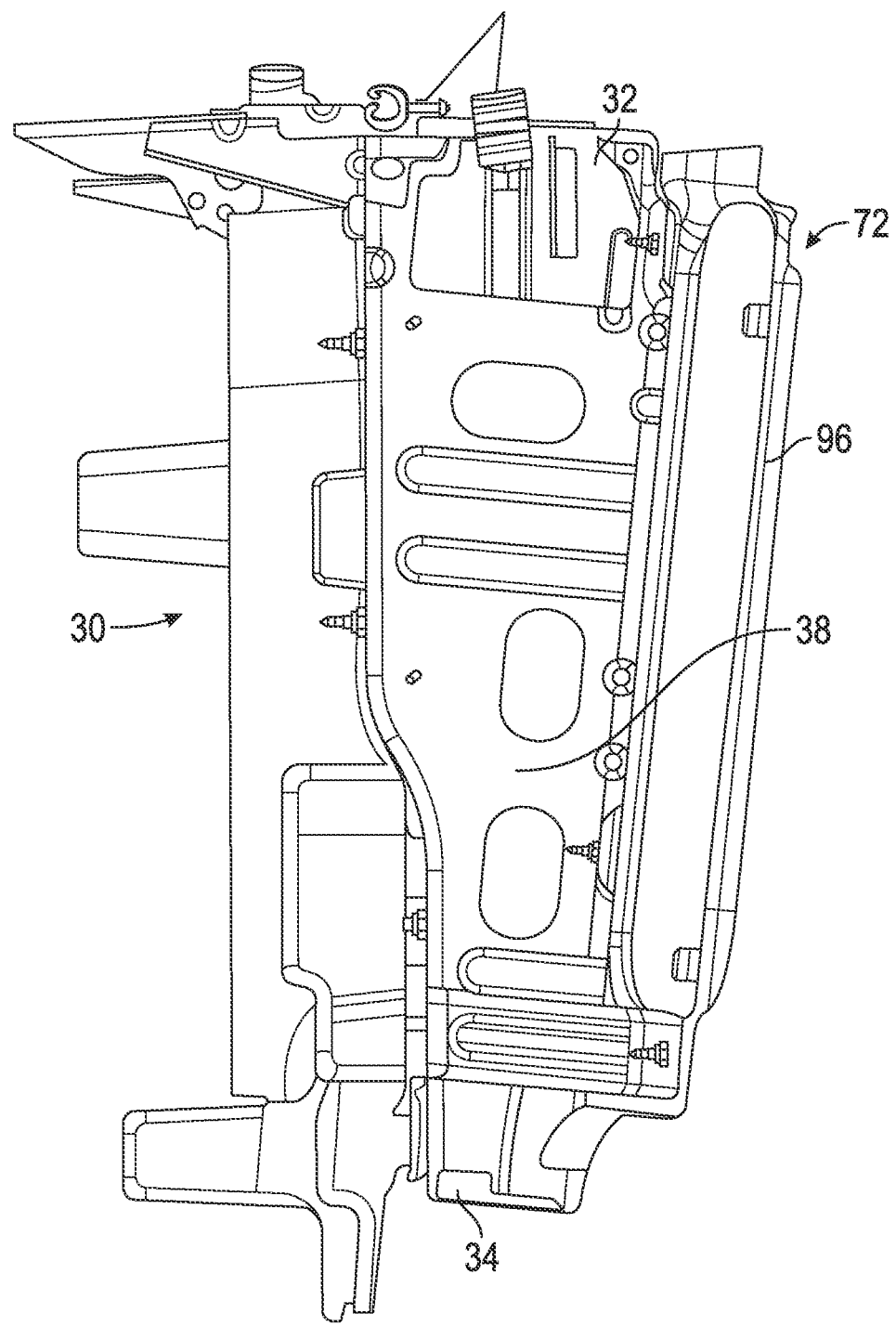
FIG. 6 is a side elevational view of the positioning and reinforcement structure.
Figure 7:
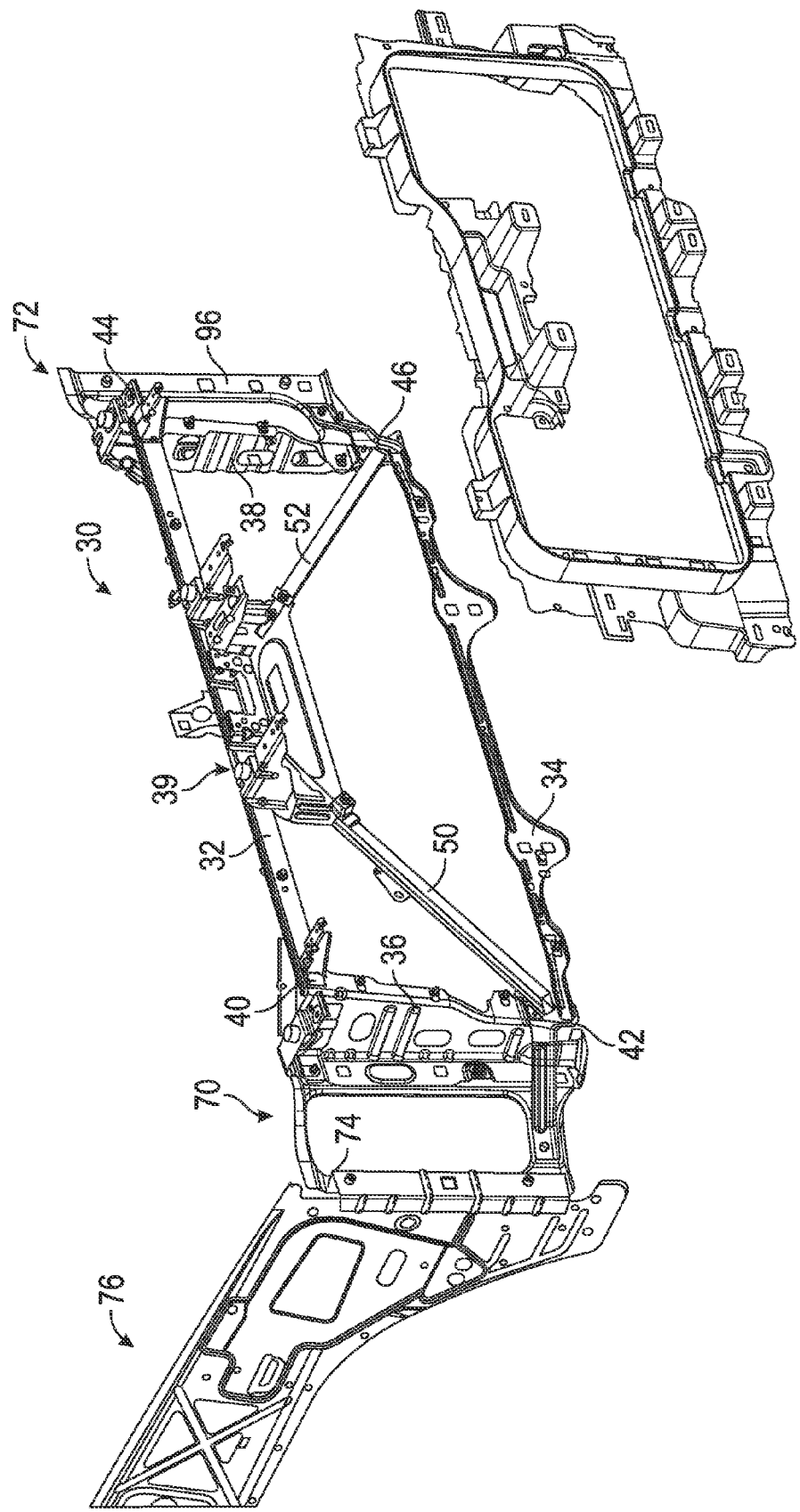
FIG. 7 is a partially disassembled perspective view of the positioning and reinforcement structure.

Referring to FIGS. 1 and 2, in accordance with an exemplary embodiment of the invention, a partially disassembled view of a front end assembly 10 of a vehicle 12 is shown in the form of an automobile. Although the vehicle 12 is illustrated as an automobile, it is to be appreciated that the embodiments disclosed herein may be employed in combination with various alternative types of vehicles. With respect to an automobile, it is to be further appreciated that the specific type of automobile is irrelevant to carrying out the embodiments described below. For example, the automobile may include a car, truck, sport utility vehicle (SUV) or van. The preceding list is merely illustrative and is not intended to be limiting of the numerous automobile types that may benefit from the embodiments of the invention.

The vehicle 12 includes a frame 14 formed of several integrally formed or operably coupled components to provide a structural support configured to directly or indirectly support components and sub-assemblies for the vehicle 12. Supported components and sub-assemblies include a plurality of body components and the vehicle 12 is typically referred to as having a body-on-frame construction, based on the direct or indirect mounting and fixing of the various components to the frame 14. The front end assembly 10 is the region of the vehicle 12 that is defined by a portion of the vehicle 12 extending from what is commonly referred to as an "A-pillar" 18 (also shown in FIG. 9) to a forward-most component, such as a bumper 20 for the vehicle 12. The front end assembly 10 may be interchangeably referred to as a "front clip" of the vehicle 12. Proximate the A-pillar 18 is a front region 22 of a vehicle door 24 that is positioned by fitting the front region 22 to a fender simulator structure 26, which simulates a nominal fender cut line and establishes a desired gap between the vehicle door 24 and a fender assembly, which will be discussed in detail below.

To facilitate assembly of the front end assembly 10, both with respect to components in relation to each other as well as to the frame 14, a positioning and reinforcement structure 30 is included. The positioning and reinforcement structure 30 generally refers to a structure configured to provide a foundation for inter-part dimensional relationships during the assembly process for all components of the front end assembly 10, thereby alleviating reliance on individual machined mounting locations. The positioning and reinforcement structure 30 also provides structural support for the attached components. In one embodiment, the positioning and reinforcement structure 30 comprises a grill opening reinforcement (GOR) structure that acts to define and reinforce a grill opening. Since the positioning and reinforcement structure 30 may be formed as an assembly, it may also be referred to herein as positioning and reinforcement assembly 30 or GOR assembly. As will be described in detail below, the positioning and reinforcement structure 30 includes locators, fastening features, and other critical dimensional relationship interfaces of several components and sub-assemblies. Such components and sub-assemblies typically include fender assemblies, headlamps, grills, fascias, bumpers and bumper attachment features, hoods and under-hood closeout panels, air baffles and radiator supports, for example. It is to be understood that the preceding list is merely illustrative of the numerous components and sub-assemblies which may be included in the front end assembly 10 and may benefit from the positioning and reinforcement structure 30. Exemplary components and sub-assemblies will be described in detail below. As used herein, an axial direction, or a fore-aft direction 26 refers to a direction that extends frontward and rearward along an axis of the vehicle, a cross-car direction 27 refers to a direction that extends laterally or across the vehicle and a vertical direction 28 refers to a direction that extends upwardly and downwardly. In one embodiment, these directions are mutually orthogonal with regard to one another.

Referring now to FIGS. 3-7, in conjunction with FIGS. 1 and 2, the positioning and reinforcement structure 30 is illustrated in greater detail. The positioning and reinforcement structure 30 includes a rectilinearly situated geometry defined by a top support member 32, a bottom support member 34, a first side member 36 and a second side member 38. The top support member 32 and the bottom support member 34 each extend relatively horizontally in the cross-car direction 27 and relatively parallel to each other. The first side member 36 and the second side member 38 extend relatively parallel to each other, but in the relatively vertical direction 28. As may be understood, the positioning and reinforcement structure 30 is therefore a substantially cross-car extending and vertically extending structure or frame. The first side member 36 is coupled proximate a first side member top region 40 to the top support member 32 and to the bottom support member 34 proximate a first side member bottom region 42. Likewise, the second side member 38 is coupled proximate a second side member top region 44 to the top support member 32 and to the bottom support member 34 proximate a second side member bottom region 46. The coupling between the top support member 32, the bottom support member 34, the first side member 36 and the second side member 38 may be in the form an integral formation process so as to form an integral positioning and reinforcement structure 30, such as by a casting, molding, or welding process, for example. Alternatively, an operable coupling may facilitate the formation of the positioning and reinforcement structure 30 as an assembly, such as by mechanical fasteners, for example. The preceding examples of the precise connections between the top support member 32, the bottom support member 34, the first side member 36, and the second side member 38 are merely illustrative and numerous alternative coupling configurations are contemplated. Furthermore, the above-described components associated with the positioning and reinforcement structure 30, as well as those described below, may comprise various materials, such as plastic or a metal. Additionally, the components may be formed as an over-mold having more than one material forming one or more of the components. Such materials may include magnesium, aluminum, and composites, for example, however, many alternative materials are contemplated. The positioning and reinforcement structure 30 or GOR structure may have any suitable size and shape, and may be used, for example, to define and reinforce a grill opening having any suitable size and shape.

The positioning and reinforcement structure 30 also includes a first brace 50 extending in a relatively diagonal manner from proximate the first side member bottom region 42 to a relatively central location along the top support member 32, to which the first brace 50 is operably coupled. The first brace 50 may be coupled to the first side member 36 or the bottom support member 34, or both. Similarly, a second brace 52 is included and extends in a relatively diagonal manner from proximate the second side member bottom region 46 to the top support member 32, to which the second brace 52 is attached. The second brace 52 may be coupled to the second side member 38 or the bottom support member 34, or both. The first brace 50 and the second brace 52 may be operably coupled to the top support member 32 in a relatively coaxial manner, such that the first brace 50 and the second brace 52 mount to a single location of the top support member 32. The first brace 50 and the second brace 52, both singularly and in combination, provide structural support for the overall positioning and reinforcement structure 30. Additionally, the first brace 50 and/or the second brace 52 include mounting and locating features corresponding to components integrated with, or associated with, the positioning and reinforcement structure 30. Also included is a shutter box 47 that is operably coupled to the positioning and reinforcement structure 30 and the shutter box 47 may be considered as part of the positioning and reinforcement structure 30. The shutter box 47 comprises a geometry that substantially covers a forward portion of the positioning and reinforcement structure 30.

Figure 8:
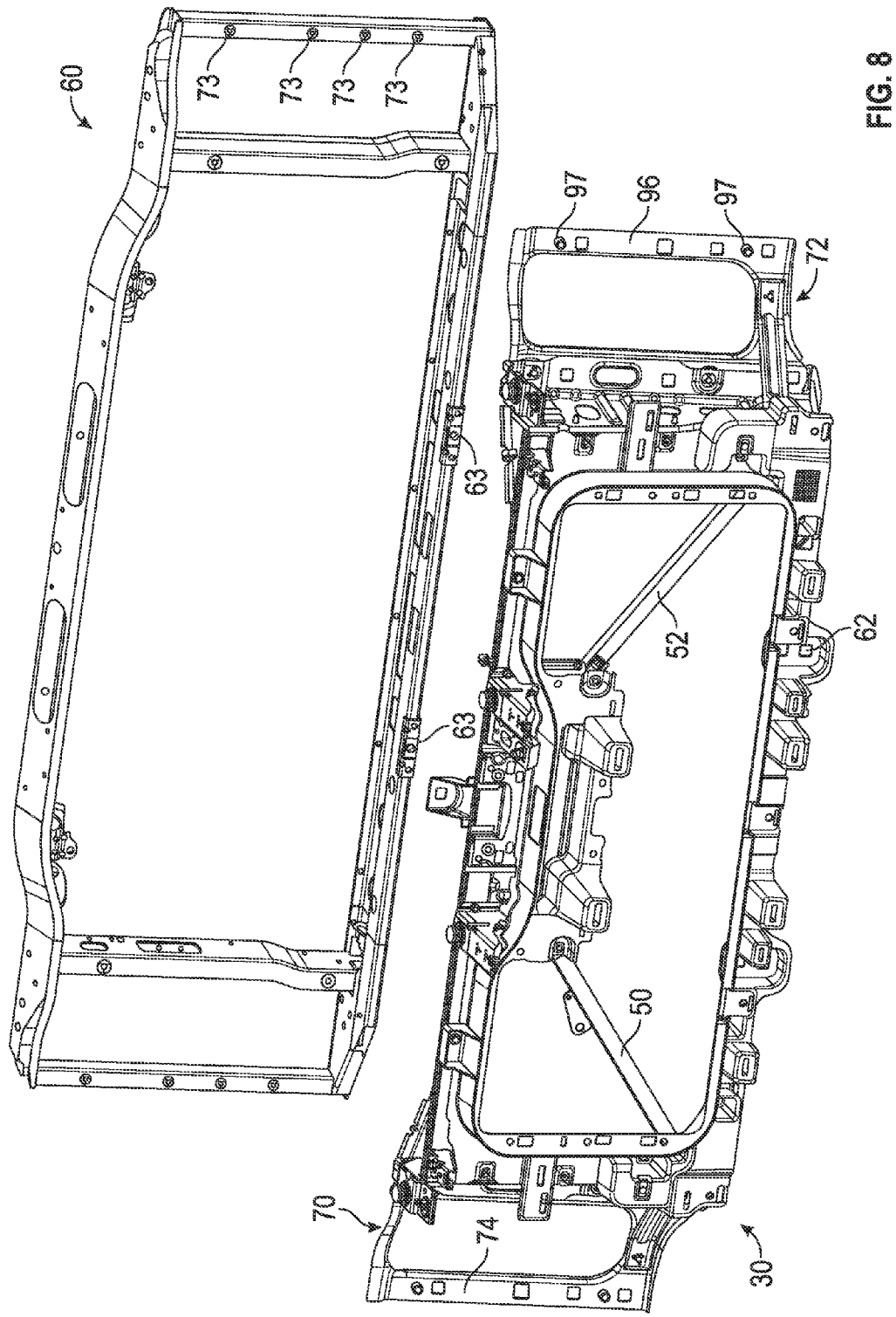
FIG. 8 is a perspective view of a radiator support prior to operable coupling with the positioning and reinforcement structure.
Figure 9:
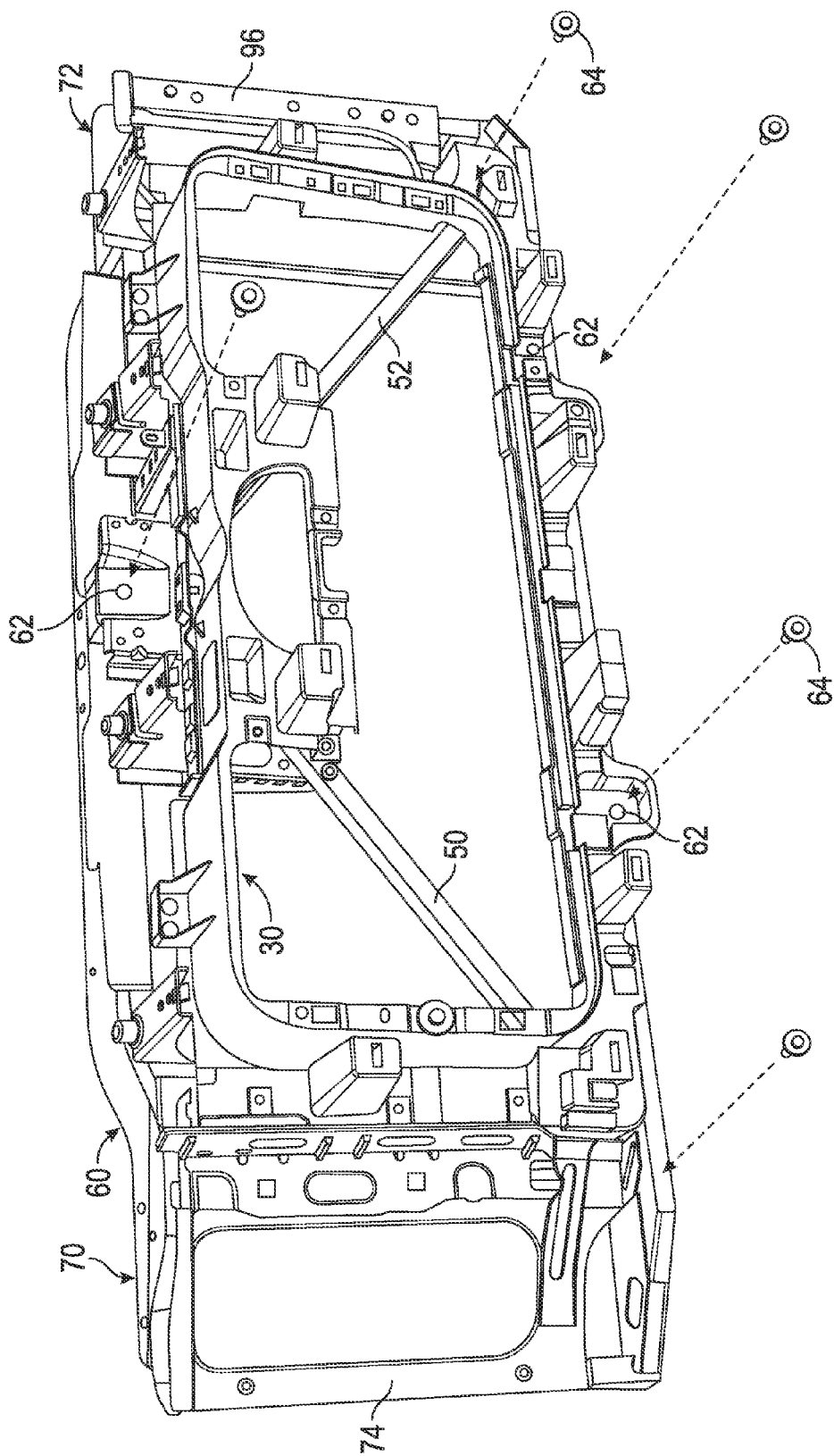
FIG. 9 is a perspective view of the radiator support and the positioning and reinforcement structure operably coupled.
Figure 12:
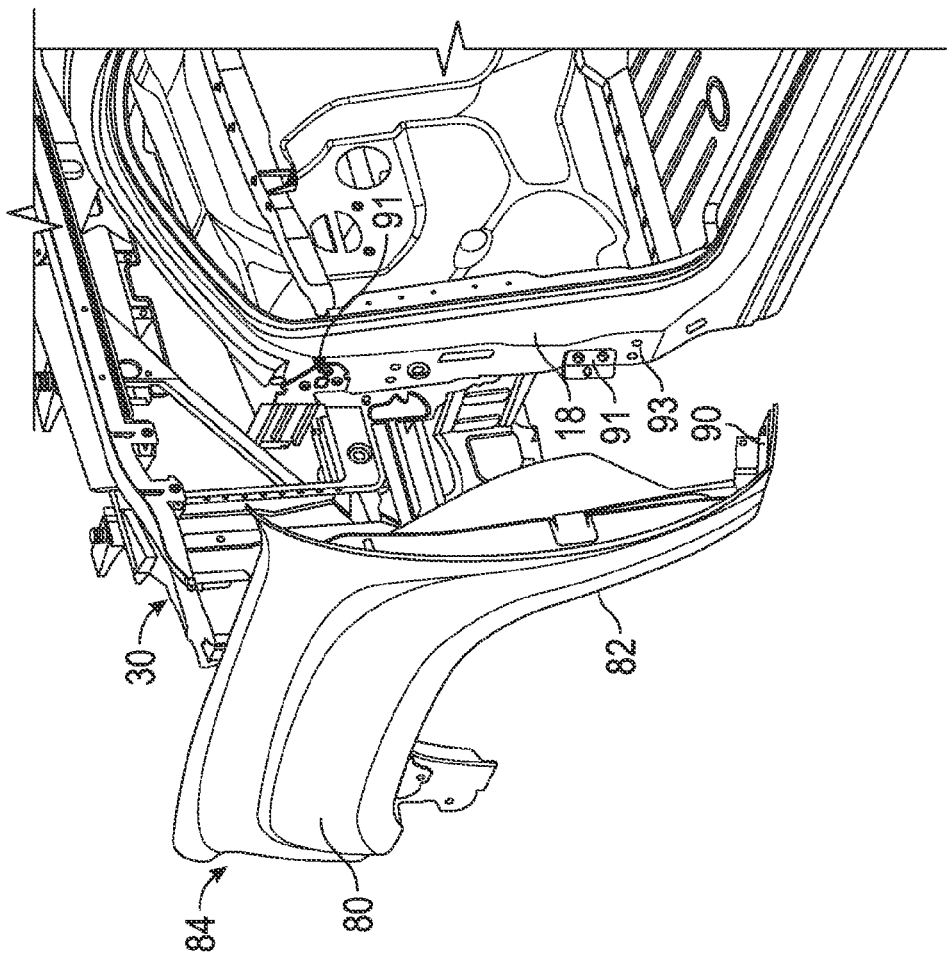
FIG. 12 is a partially disassembled rear, perspective view of the fender assembly.
Figure 11:
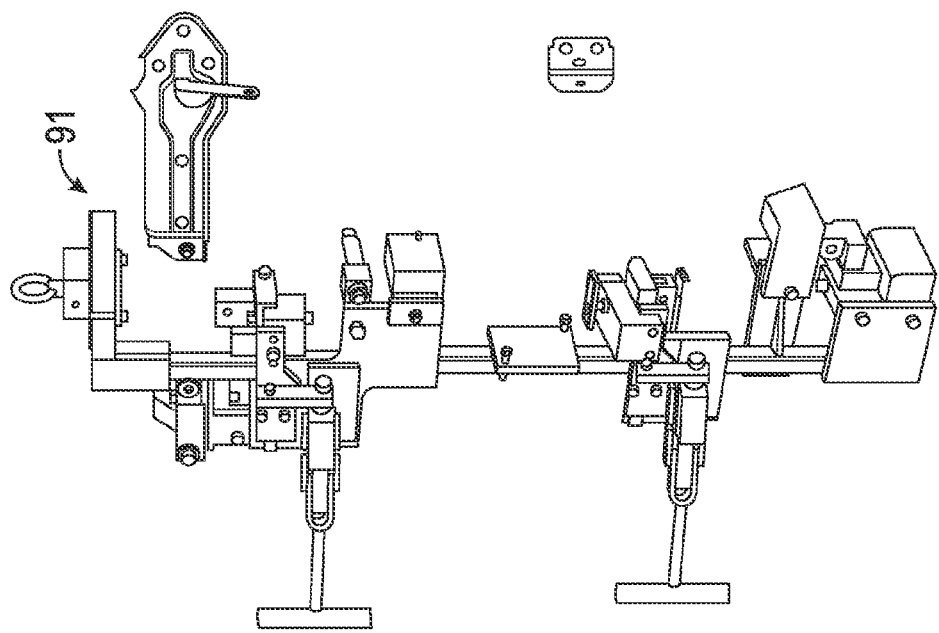
FIG. 11 is a perspective view of a fender mount bracket of the fender assembly.
Figure 13:
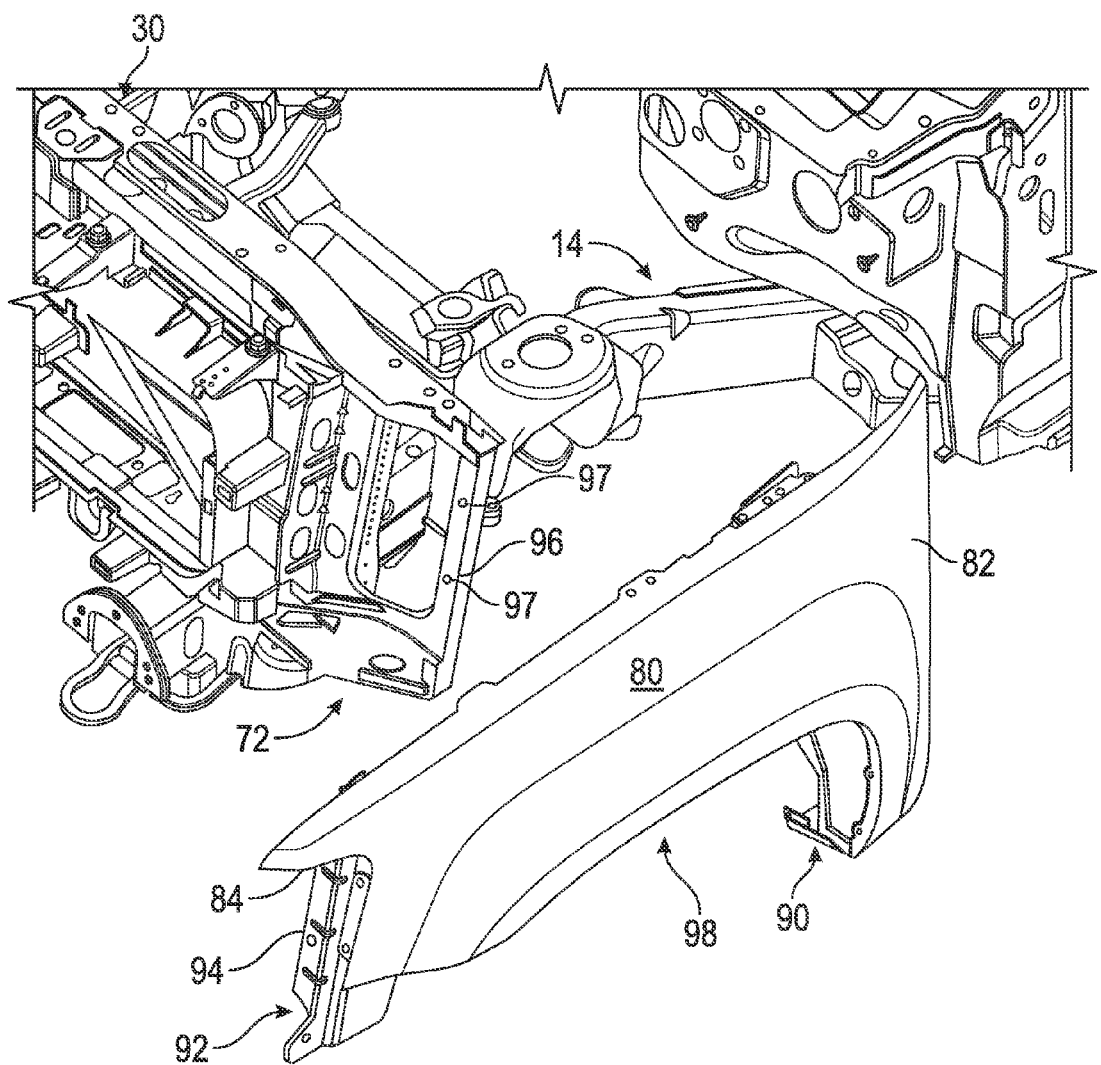
FIG. 13 is a partially disassembled top, front perspective view of the fender assembly.
Figure 14:
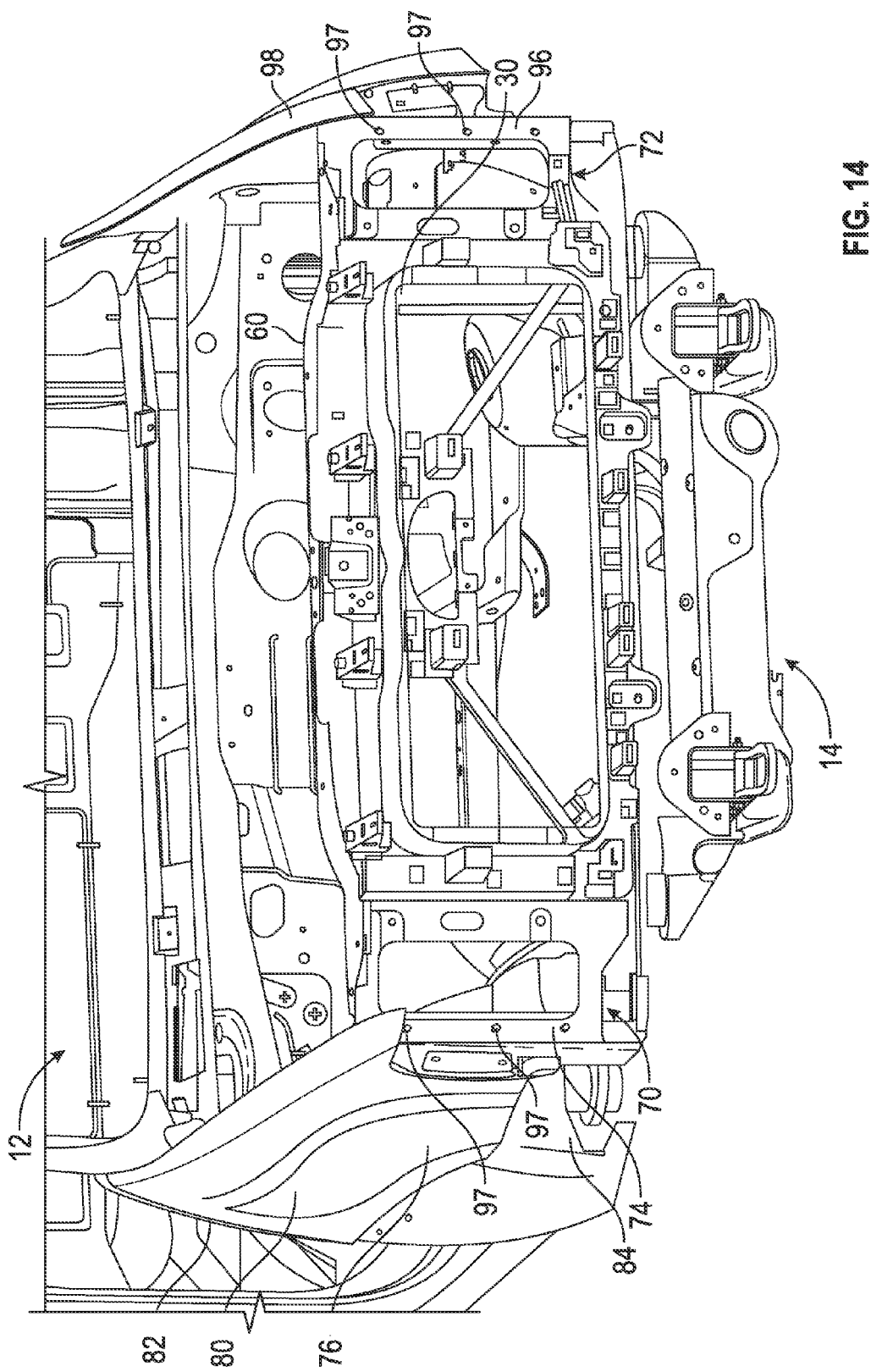
FIG. 14 is a perspective view of the fender assemblies operably coupled to the radiator support and the positioning and reinforcement structure.
Figure 16:
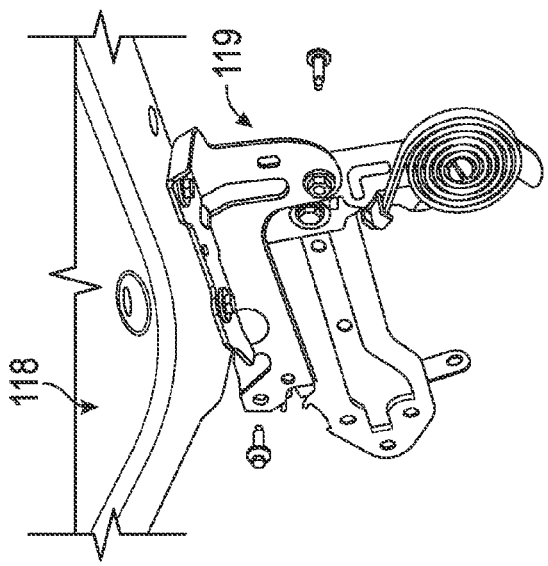
FIG. 16 is a perspective view of a hood hinge pivot component.
Figure 15:
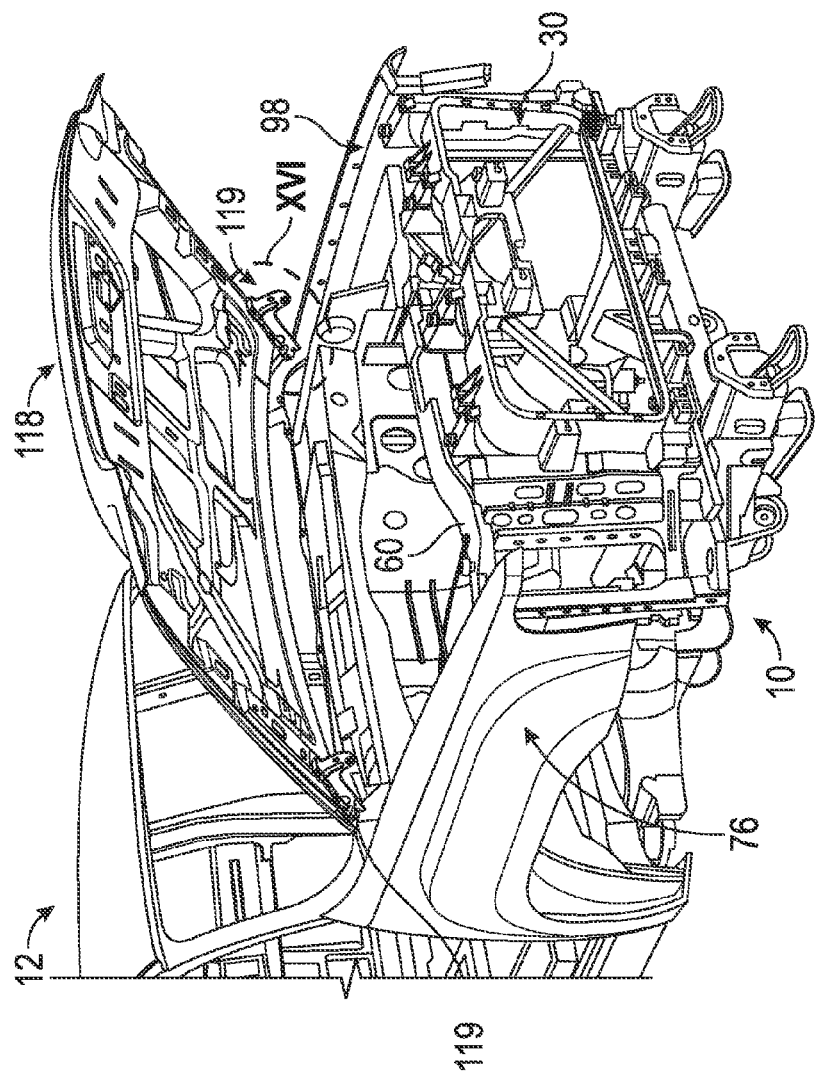
FIG. 15 is a perspective view of a hood pivotably attached to the vehicle.
Figure 17:
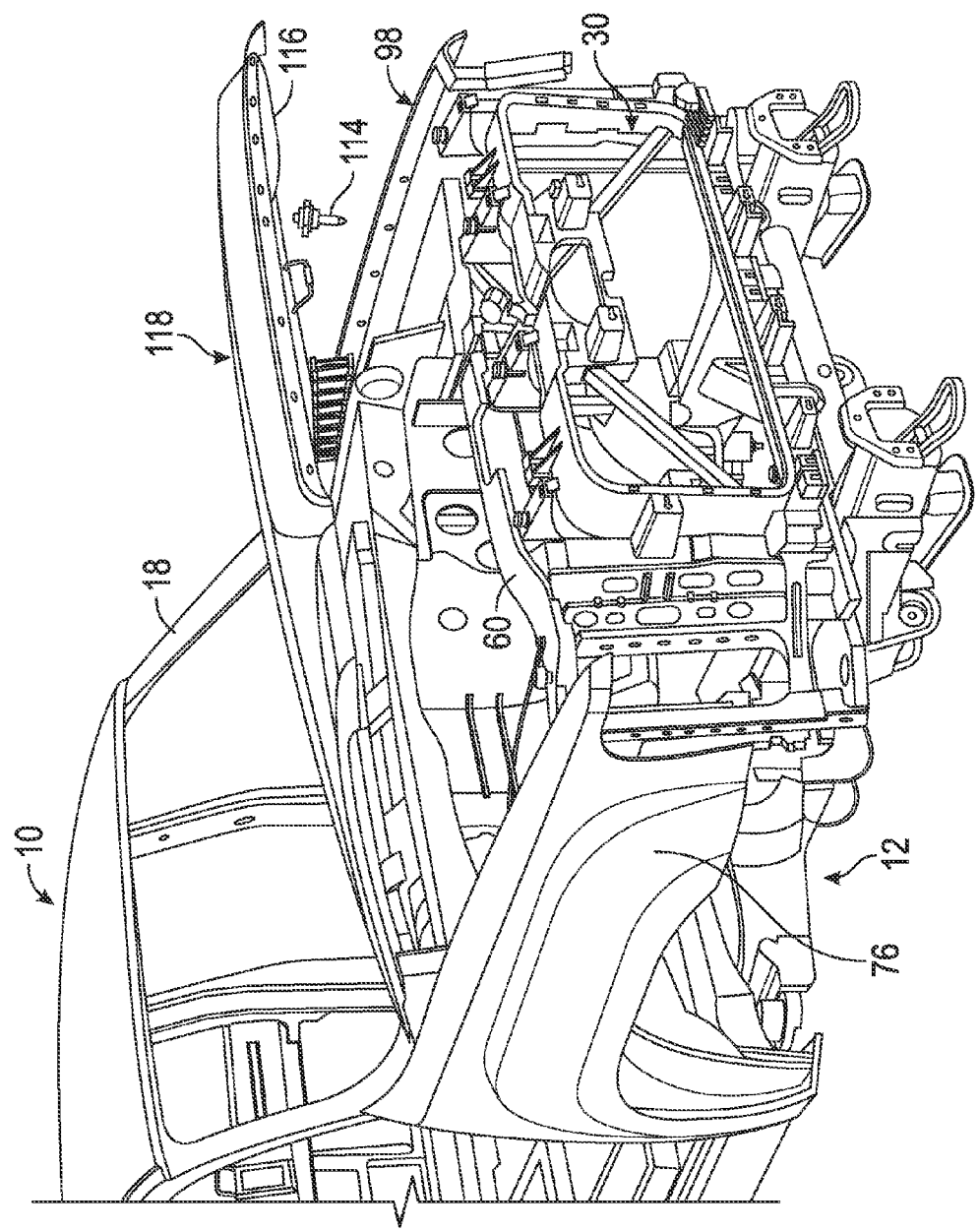
FIG. 17 is a perspective view of the hood disposed proximate the positioning and reinforcement structure with a partially disassembled centering pin.

Referring now to FIGS. 8 and 9, a radiator support 60 is configured to operably couple to an aft portion of the positioning and reinforcement structure 30. A plurality of apertures 62 are disposed in numerous locations along the positioning and reinforcement structure 30 that correspond to receiving structures 63 disposed within a front face of the radiator support 60. In one embodiment, a plurality of mechanical fasteners 64 are employed and extend through the plurality of apertures 62 into the receiving structures of the radiator support 60 to fixedly retain the positioning and reinforcement structure 30 to the radiator support 60. It is to be appreciated that although the positioning and reinforcement structure 30 and the radiator support 60 are ultimately disposed in a fixed relationship to each other, a loose fitting relationship between the positioning and reinforcement structure 30 and the radiator support 60 is employed during several assembly phases of the front end assembly 10. This is achieved by partially installing mechanical threaded fasteners. Specifically, while the radiator support 60 is fixedly secured to the frame 14, the positioning and reinforcement structure 30 has at least one degree of freedom with respect to displacement relative to the radiator support 60. Such a relationship allows the positioning and reinforcement structure 30 to move during mounting of other components to the positioning and reinforcement structure 30. The tight, fixed relationship between the positioning and reinforcement structure 30 and the radiator support 60 is not established until various other components of the front end assembly 10 are properly located and mounted, as will be described in detail below.

Referring again to FIGS. 3-7, in combination with FIGS. 10-14, the positioning and reinforcement structure 30 includes a first wing structure 70 and a second wing structure 72, with the first wing structure 70 being detachably coupled to the first side member 36, while the second wing structure 72 is detachably coupled to the second side member 38. The first wing structure 70 includes a first side flange 74 proximate an outermost location of the first wing structure 70 for fixing the positioning and reinforcement structure 30 to a first fender assembly 76. As will be described below, a second fender assembly 98 is also included and comprises substantially similar components (i.e., mirror images) as that of the first fender assembly 76, such that common reference numerals are employed. Additionally, reference to the illustrated embodiments may interchangeably denote components of the first fender assembly 76 and the second fender assembly 98 for purposes of discussion. The first fender assembly 76 and the second fender assembly each include a fender 80 having an aft end 82 and a forward end 84, with the aft end 82 being fixable to a region in close proximity to a front edge 86 of a vehicle door opening. A fender mount bracket 90 is fastened to at least one fixture 91. The fixture 91 is installed to a body side panel 93 proximate the A-pillar 18 via a plurality of mechanical fasteners. The fender mount bracket 90 provides a shelf for locating, aligning and securing the aft end 82 of the fender 80 proximate the front edge 86 of the vehicle door 24. It is contemplated that a plurality of fender mount brackets are employed.

The positioning of the first fender assembly 76, and more specifically the fender 80, is the first in a chain of inter-component locating steps. The aft end 82 is positioned relative to the front edge 86 of the vehicle door 24 to establish a desired gap between the fender 80 and the vehicle door 24, thereby reducing undesirably small or large gaps or non-uniform gaps. The aft end 82 of the fender 80 is guided onto the fender mount bracket 90 to provide relatively vertical control of the fender 80. At least one mechanical fastener, such as a shoulder bolt, loosely secures the aft end 82 proximate an upper portion of the aft end 82 to a body region proximate the A-pillar 18, such as a hood hinge bracket, for example. Securing at this region sets the fender 80 to the A-pillar 18 in the cross-car direction 27. As noted above, a second fender mount bracket, and therefore a second fixture 91, may be employed and another mechanical fastener may be disposed at this region of the aft end 82, thereby establishing complete cross-car retention of the aft end 82 of the fender 80, relative to the A-pillar 18. The forward end 84 of the fender 80 includes a fender flange 92 having one or more apertures 94 for receiving one or more pins 97 extending forwardly from the first side flange 74 of the first wing structure 70, thereby establishing a displaceable relationship between the first fender assembly 76 and the positioning and reinforcement structure 30 and setting the positioning and reinforcement structure 30 in the vertical direction 28.

The second wing structure 72 includes a second side flange 96 proximate an outermost location of the second wing structure 72 for fixing the positioning and reinforcement structure 30 to the second fender assembly 98. As noted above, the second fender assembly 98 is a mirror image of the first fender assembly 76 and is disposed at an opposite cross-car location of the vehicle 12, such that detailed description of the second fender assembly 98 is unnecessary, as are associated reference numerals. Similar to the first fender assembly 76, the second fender assembly 98 mounts to a region proximate a front edge 86 of a vehicle door and a displaceable relationship between the second fender assembly 98 and the positioning and reinforcement structure 30 is established by disposal of the fender flange 92 over at least one pin 97 of the second side flange 96.

The first fender assembly 76 and the second fender assembly 98 are each attached to the radiator support 60 with one or more mechanical fasteners, such as shoulder bolts, extending through at least one location proximate the first side flange 74 and the second side flange 96 of the first wing structure 70 and the second wing structure 72, respectively, the mechanical fasteners further extending through corresponding receiving apertures 73 disposed in the radiator support 60. The mechanical fasteners may comprise a threaded fastener, such as a shoulder bolt, which draws the radiator support 60 forwardly to an aft surface of the positioning and reinforcement structure 30, thereby establishing a fore-aft plane that the radiator support 60 and the positioning and reinforcement structure 30 are located in. Specifically, the first fender assembly 76 and the second fender assembly 98 determine the fore-aft location of the radiator support 60 and the positioning and reinforcement structure 30 upon engagement of the first fender assembly 76 and the second fender assembly 98 with the positioning and reinforcement structure 30 and the radiator support 60. As described above, the radiator support 60 has a loose fitting relationship with the positioning and reinforcement structure 30 during at least a portion of the assembly, and a slipping relationship between the radiator support 60 and the positioning and reinforcement structure 30 in the cross-car direction 27 and the up-down direction is maintained subsequent to establishing the fore-aft location.

Referring now to FIGS. 15-18, a hood 118 is pivotably connected to the vehicle 12 proximate the A-pillar 18. To establish the pivotable connection to the vehicle 12, a hood hinge pivot component 119 is installed proximate a rear portion of the hood 118 on a first side and a second side of the hood 118, the hood hinge pivot component 119 also including a hood spring. A centering pin 114 is installed proximate a front region of an underside 116 of the hood 118 within a locator hole 121. Disposed in a securely fixed manner proximate the top support member 32 of the positioning and reinforcement structure 30 is a centering bracket 110 that includes a hood locating aperture 112 configured to receive the centering pin 114 operably connected to, and extending downward from, the underside 116 of the hood 118. Upon insertion of the centering pin 114 into the hood locating aperture 112, a fixed relationship between the hood 118 and the positioning and reinforcement structure 30 is established in the cross-car direction 27, such that cross-car movement of either the positioning and reinforcement structure 30 or the hood 118 results in a corresponding cross-car movement of the other component. Although the centering pin 114 is illustrated and described above as being operably connected to the hood 118, it is contemplated that the centering pin 114 may alternately be coupled to, and extend upward from, the centering bracket 110, with the hood locating aperture 112 being disposed within the underside 116 of the hood 118.

As noted above, and as will be further apparent from the description below, the centering bracket 110 is employed to locate and secure one or more components relative to one another to provide a desired dimensional and structural configuration. In one embodiment, the centering bracket 110 provides a datum reference location that several components of the front end assembly 10 are directly or indirectly positioned relative to. Such an embodiment provides a single common locating feature, thereby reducing the tolerance stack-up that commonly persists in front end assemblies requiring a plurality of locating features manufactured independent of each other.

Figure 19:
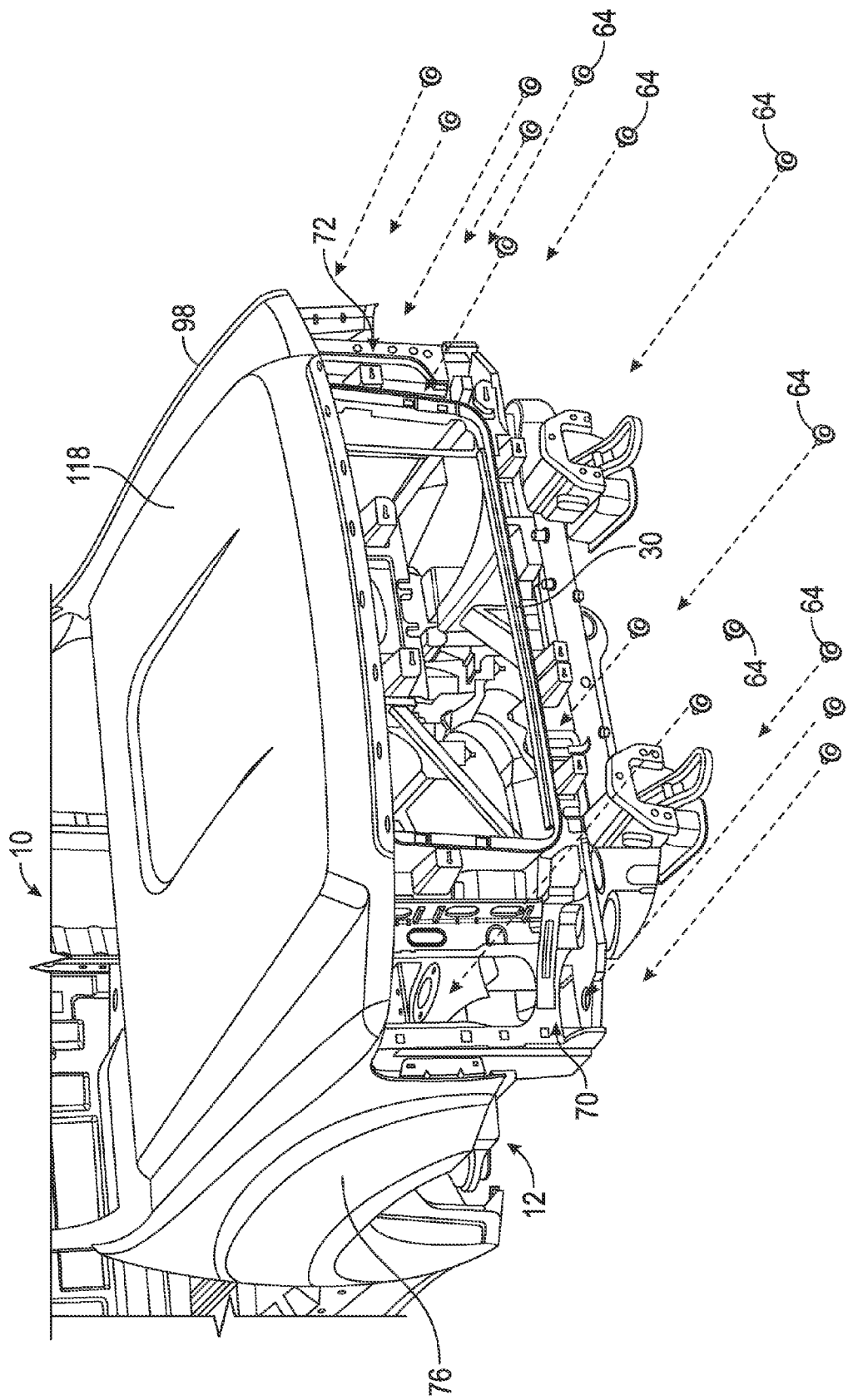
FIG. 19 is a perspective view illustrating the positioning and reinforcement structure being fixedly secured to the radiator support.

Referring to FIG. 19, although it is contemplated that final, tight-fitting securement between the positioning and reinforcement structure 30 and the radiator support 60 may be established at various points during assembly of the front end assembly 10, an exemplary embodiment includes final mechanical fastening subsequent to establishing the fixed cross-car relationship between the hood 118 and the positioning and reinforcement structure 30. The tight-fitting relationship between the positioning and reinforcement structure 30 and the radiator support 60 sets a desired gap spacing between the hood 118 and the first fender assembly 76 and the second fender assembly 98.

Figure 20:
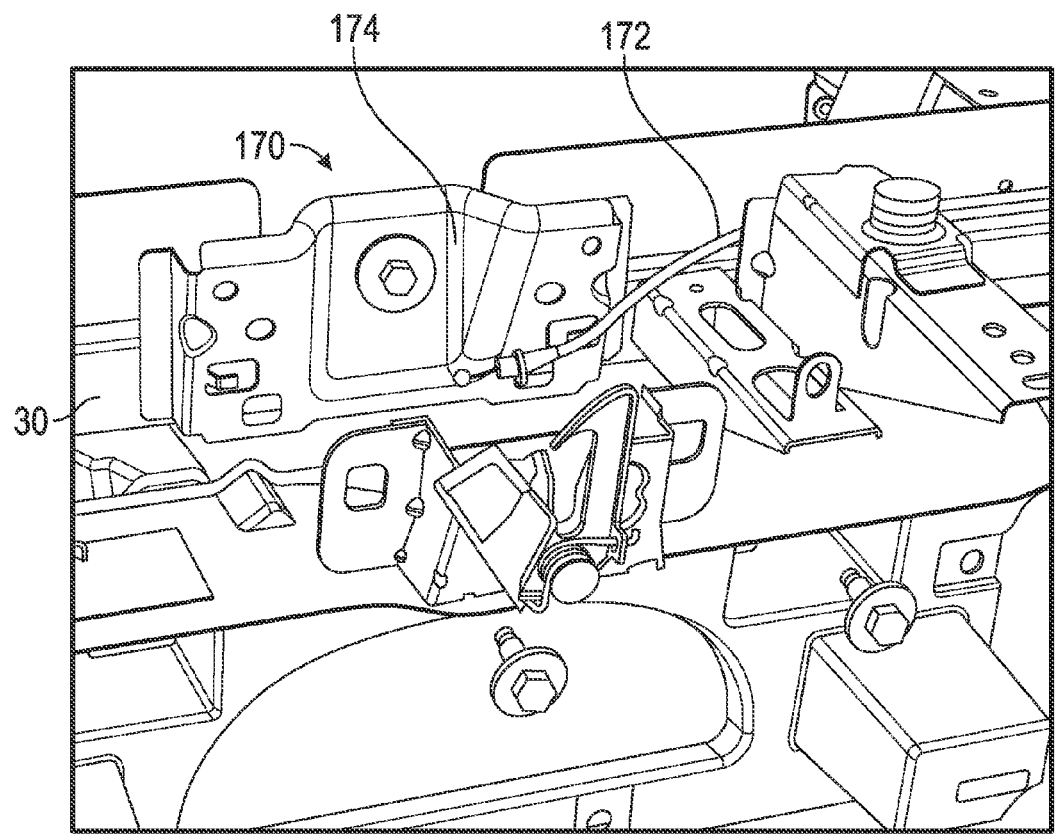
FIG. 20 is a partially disassembled perspective view of a hood latch assembly.
Figure 21:
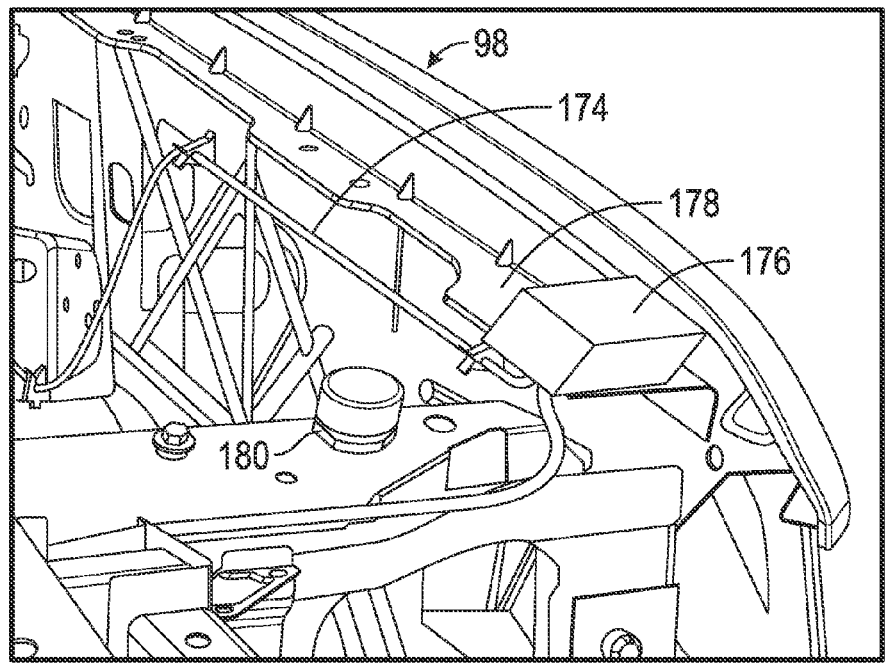
FIG. 21 is a perspective view of a hood release cable.
Figure 22:
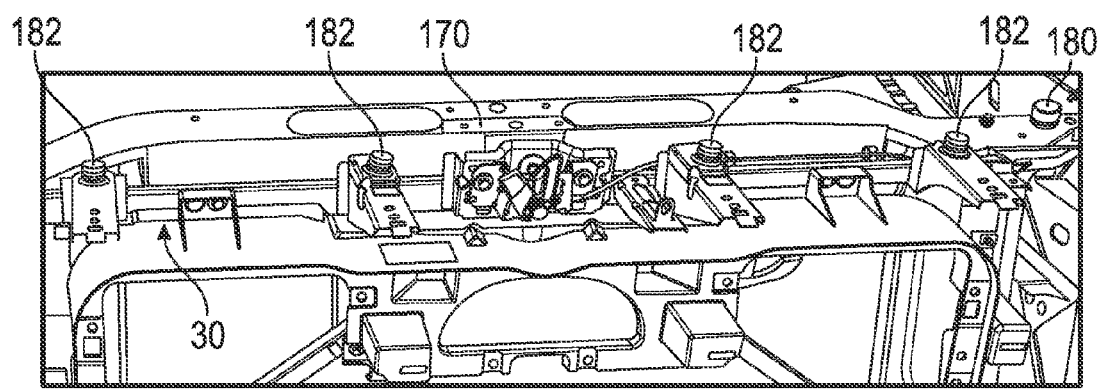
FIG. 22 is a perspective view of the hood latch assembly operably coupled to the positioning and reinforcement structure.

Referring now to FIGS. 20-22, a hood latch assembly 170 is operably coupled to the positioning and reinforcement structure 30 with at least one mechanical fastener. In the exemplary embodiment, a hood release cable 172 is fixed to the hood latch assembly 170 prior to coupling of the hood latch assembly 170 to a latch retaining plate 174 fixedly secured, and extending upwardly from, the positioning and reinforcement structure 30.

Figure 23:
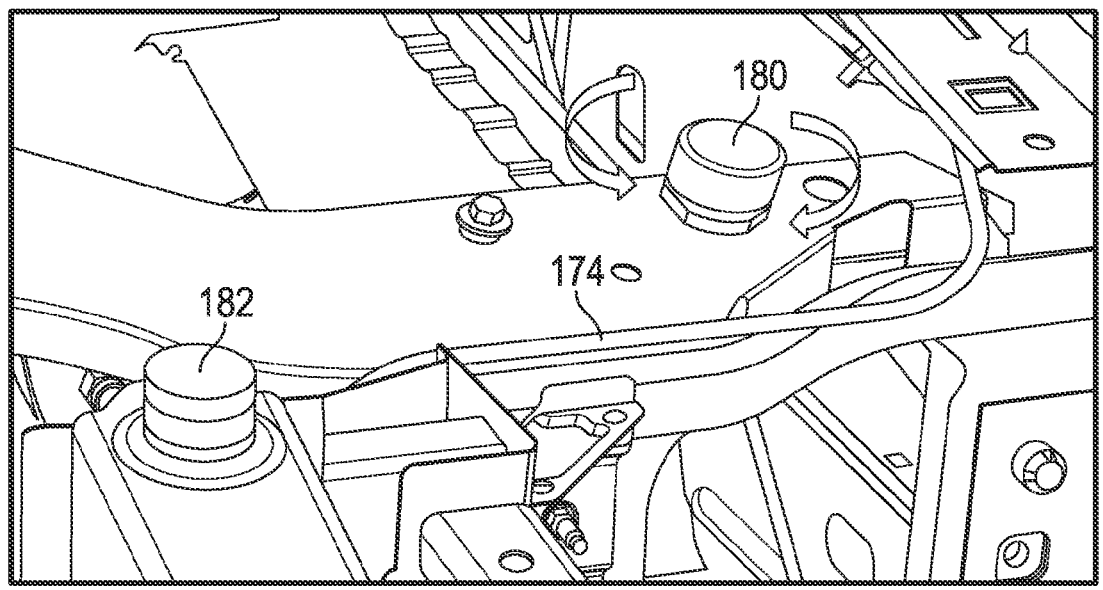
FIG. 23 is a perspective view of a hood overslam bumper.

Referring to FIG. 23, subsequent to installation of the hood latch assembly 170, a hood positioning block 176 (FIG. 21) provides a preload to hood mounting components 178 disposed proximate the first fender assembly 76 and the second assembly 98. The preload imposed by the hood positioning block 176 simulates setting of the hood 118 at a lower than nominal position and in the exemplary embodiment the lower than nominal position may be about 1.5 mm low. This arrangement requires at least one hood adjustable bumper 180 and at least one hood overslam bumper 182 to be set to respective lower than nominal positions. Subsequent to installation of the at least one hood adjustable bumper 180 and the at least one hood overslam bumper 182, the hood 118 is closed and the hood latch assembly 170 is tightened to a fully engaged configuration. The at least one hood overslam bumper 182 may be rotated to move the hood 118 in the relatively vertical direction 28 to a desired position, such as having its outer surface flush with those of the first fender assembly 76 and the second fender assembly 98. Subsequently, the at least one overslam bumper 182 may be adjusted in the relatively vertical direction 28 to a desired location, such as proximate the underside 116 of the hood 118.

Figure 24:
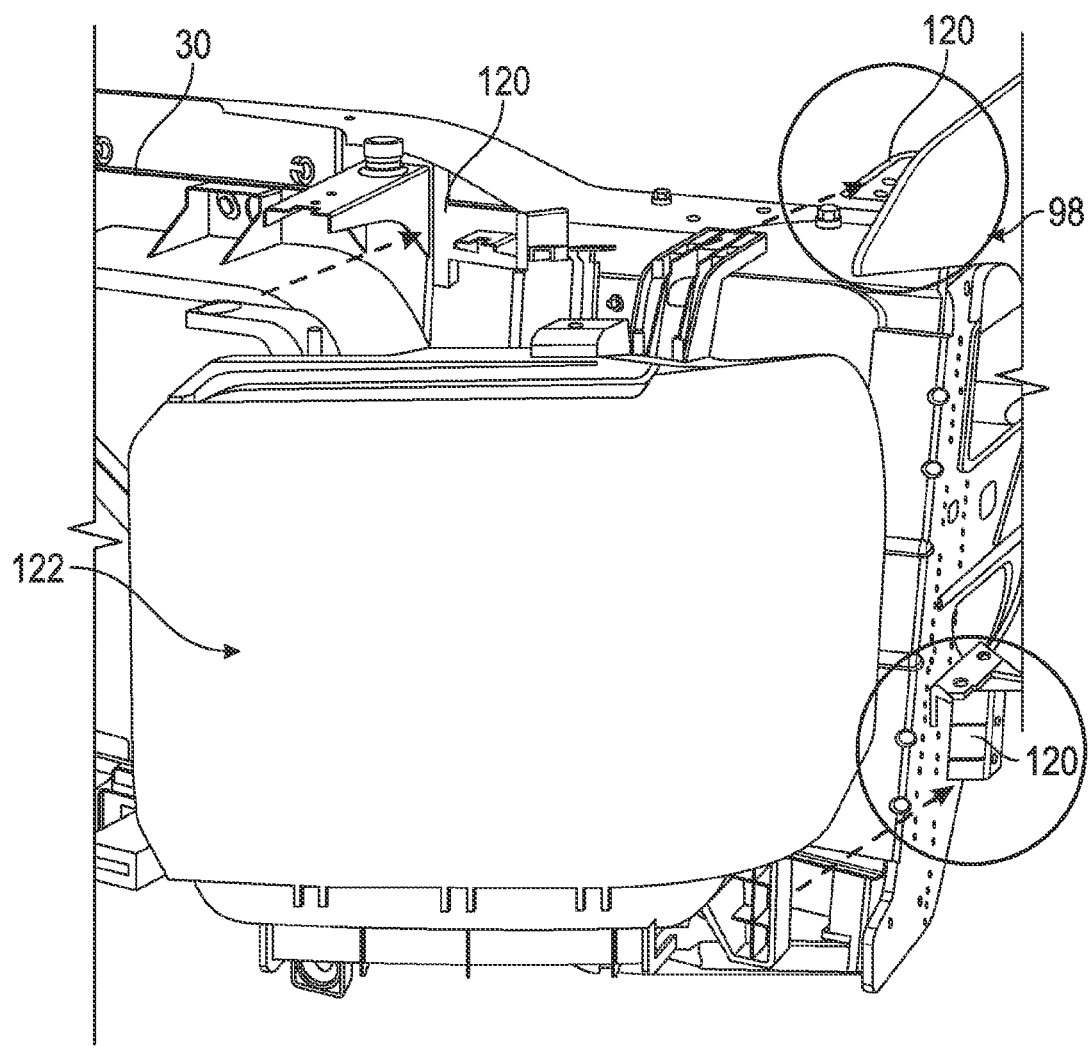
FIG. 24 is a perspective view illustrating a headlamp assembly being installed.

As illustrated in FIG. 24, in addition to the previously described locating and mounting features associated with the positioning and reinforcement structure 30, a plurality of headlamp locating and mounting interfaces 120 are included in association with loading, staging, locating and mounting of a headlamp assembly 122. The plurality of headlamp locating and mounting interfaces 120 may include such features as guiding paths to facilitate insertion of the headlamp assembly 122 in the fore-aft direction 26 (FIG. 1), as well as apertures and/or mechanical fasteners to securely retain the headlamp assembly 122, which may also be in operable connection with either fender assembly 76, 98.

Figure 25:
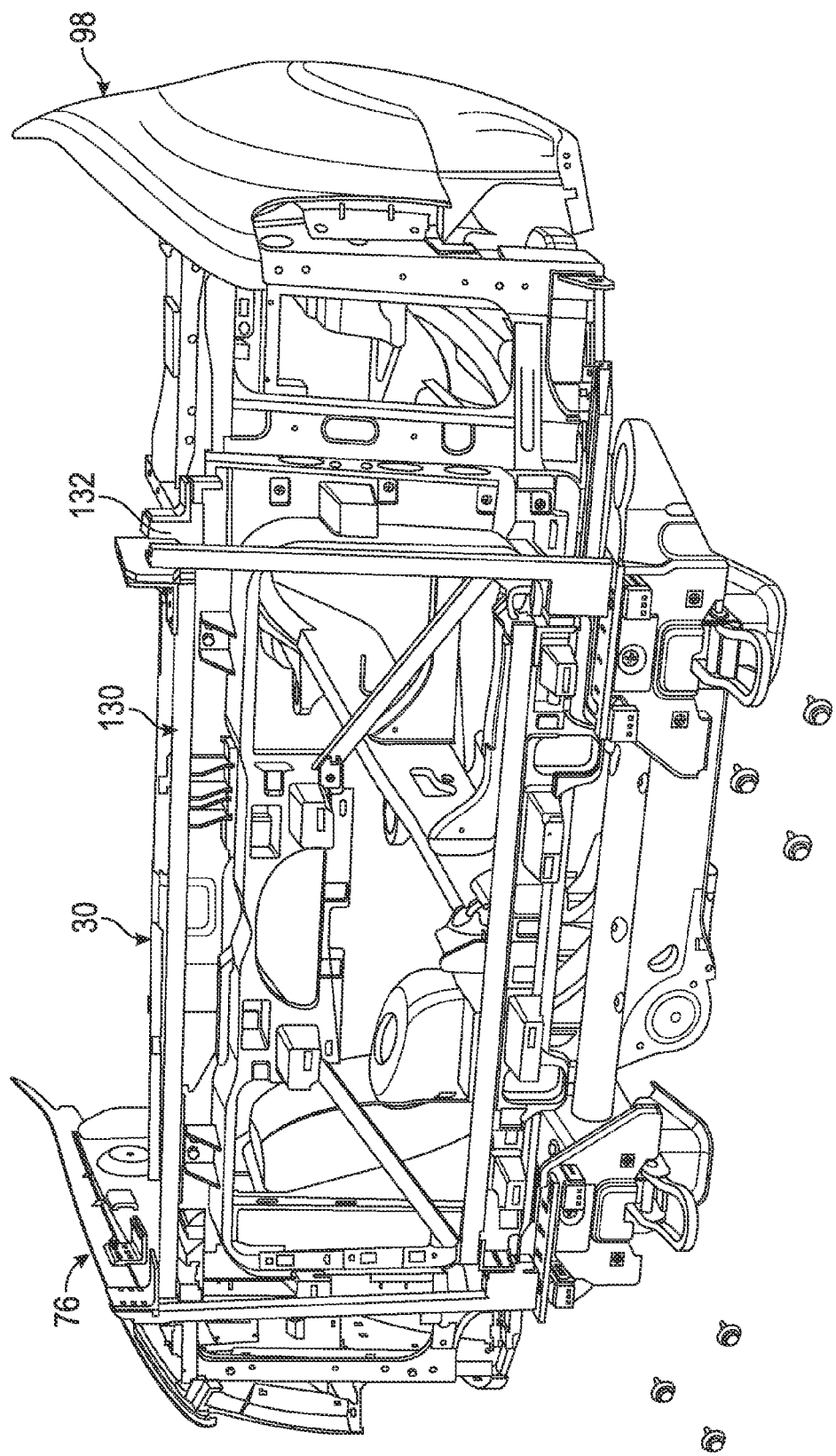
FIG. 25 is a perspective view of a bumper attachment bracket disposed proximate a forward side of the positioning and reinforcement structure.

Additionally, a bumper attachment bracket 130 (FIG. 25) utilizes bumper attachment bracket locating features 132 extending forwardly from the positioning and reinforcement structure 30 to ensure proper positioning of the bumper attachment bracket 130 prior to securing the bumper attachment bracket 130 to the frame 14 of the vehicle 12, as well as the positioning and reinforcement structure 30. Establishing proper positioning of the bumper attachment bracket 130 facilitates achieving a desired location of a bumper upon attachment to the bumper attachment bracket 130.

Figure 18:
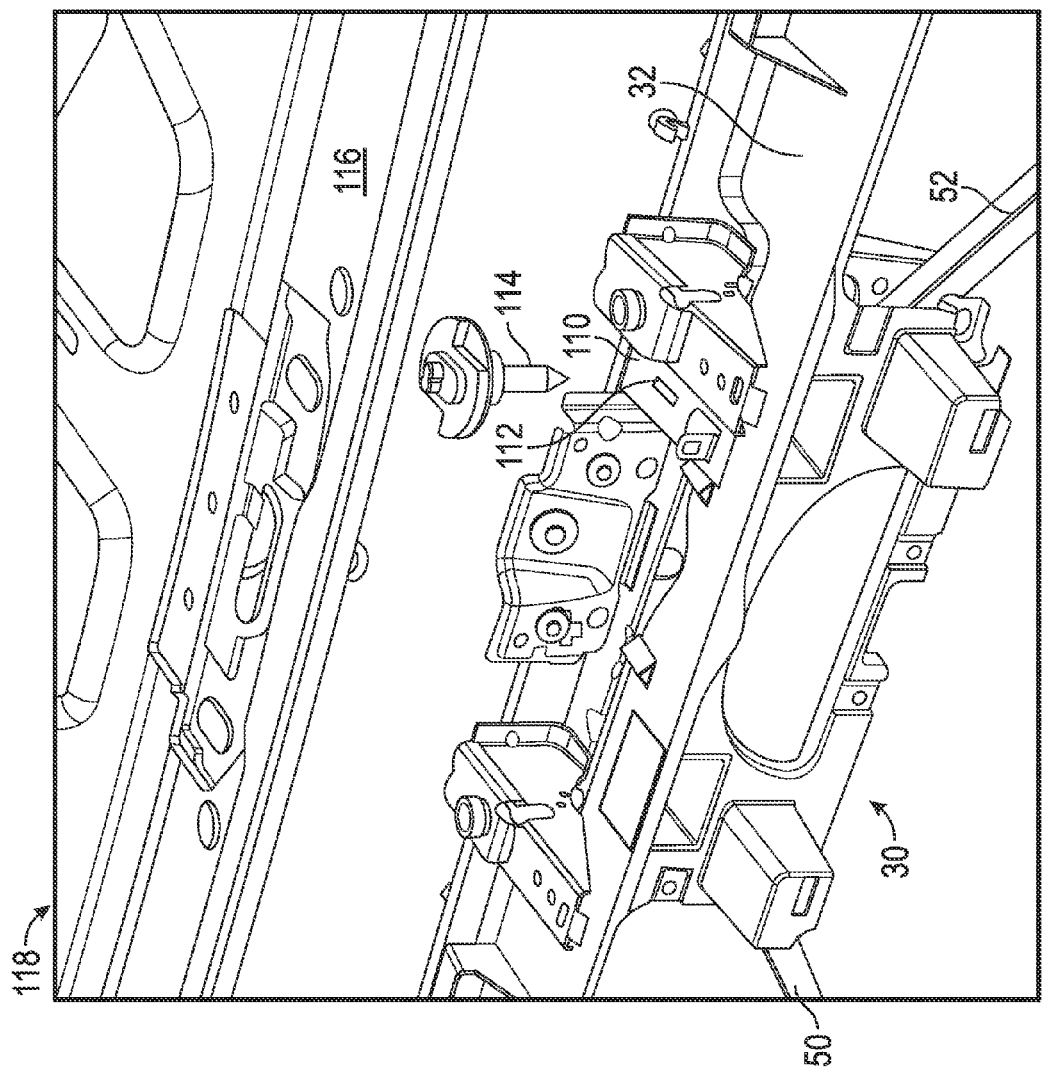
FIG. 18 is a perspective view of the hood prior to locating the hood relative to the positioning and reinforcement structure with the partially disassembled centering pin.
Figure 26:
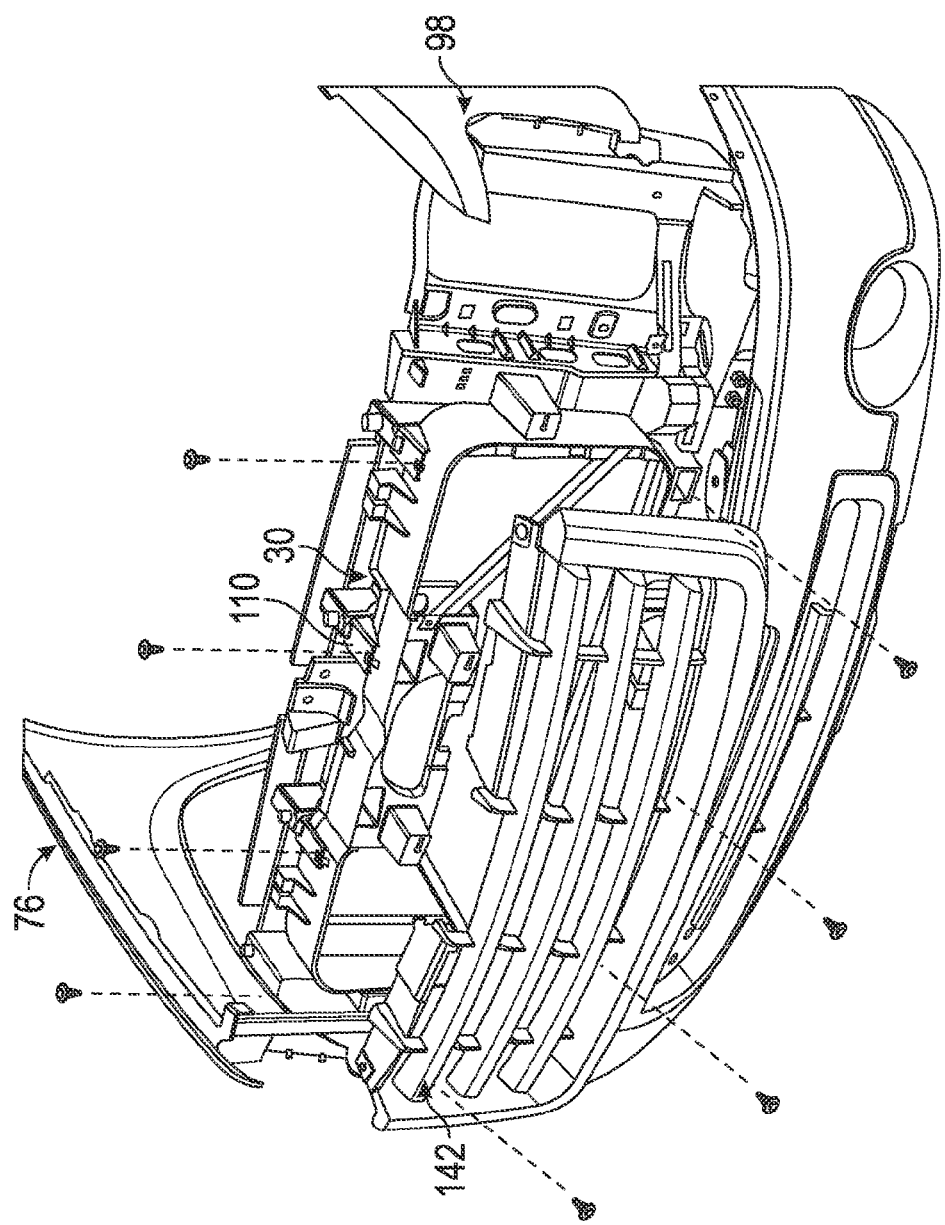
FIG. 26 is a perspective view illustrating installation of a grill to the positioning and reinforcement structure.
Figure 27:
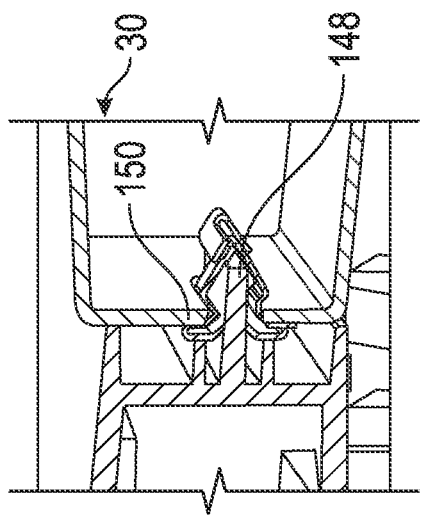
FIG. 27 is a perspective view of a grill locating feature operably coupled to the positioning and reinforcement structure.
Figure 28:
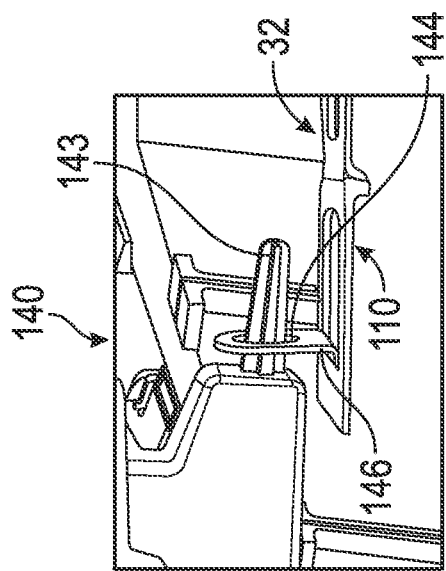
FIG. 28 is a perspective view of a grill retaining feature received within a grill retaining interface of the positioning and reinforcement structure.

Referring to FIGS. 26-28, as well as FIGS. 18 and 20, a grill locating feature 140 is disposed on the positioning and reinforcement structure 30 to properly locate a grill 142 upon mounting to the front end assembly 10. The grill locating feature 140 may be in the form of an aperture located proximate the top support member 32 and in an exemplary embodiment, the grill locating feature 140 comprises an aperture 144 disposed within an upstanding portion 146 of the centering bracket 110, which was described in detail above. In the exemplary embodiment referenced, the grill 142 includes a protrusion, such as a pin, configured to fittingly extend into the aperture 144 of the centering bracket 110, thereby locating the grill 142 in a cross-car direction, as well as fore-aft and vertical directions. One or more grill retaining features 148, such as clips, attached to the grill 142 extend into corresponding grill retaining interfaces 150 disposed within the positioning and reinforcement structure 30. There are up-down and fore-aft grille locating features on the top support member 32 and support bracket hardware. Additional securement of the grill 142 may be achieved by employing a plurality of mechanical fasteners through the grill 142 and into corresponding receiving structures.

Advantageously, the positioning and reinforcement structure 30 is desensitized dimensionally from the radiator support 60, as well as the frame 14 of the vehicle 12 generally, such that relative movement between the two components is provided during at least a portion of the assembly process of the front end assembly 10. Various locating and retaining features provide a datum for ensuring desirable dimensional relationships between several components of the front end assembly 10, thereby reducing or eliminating undesirable non-uniform gaps and spacings between the various components associated with tolerance stack-up and manufacturing variation, as seen in typical assembly processes.

Figure 29:
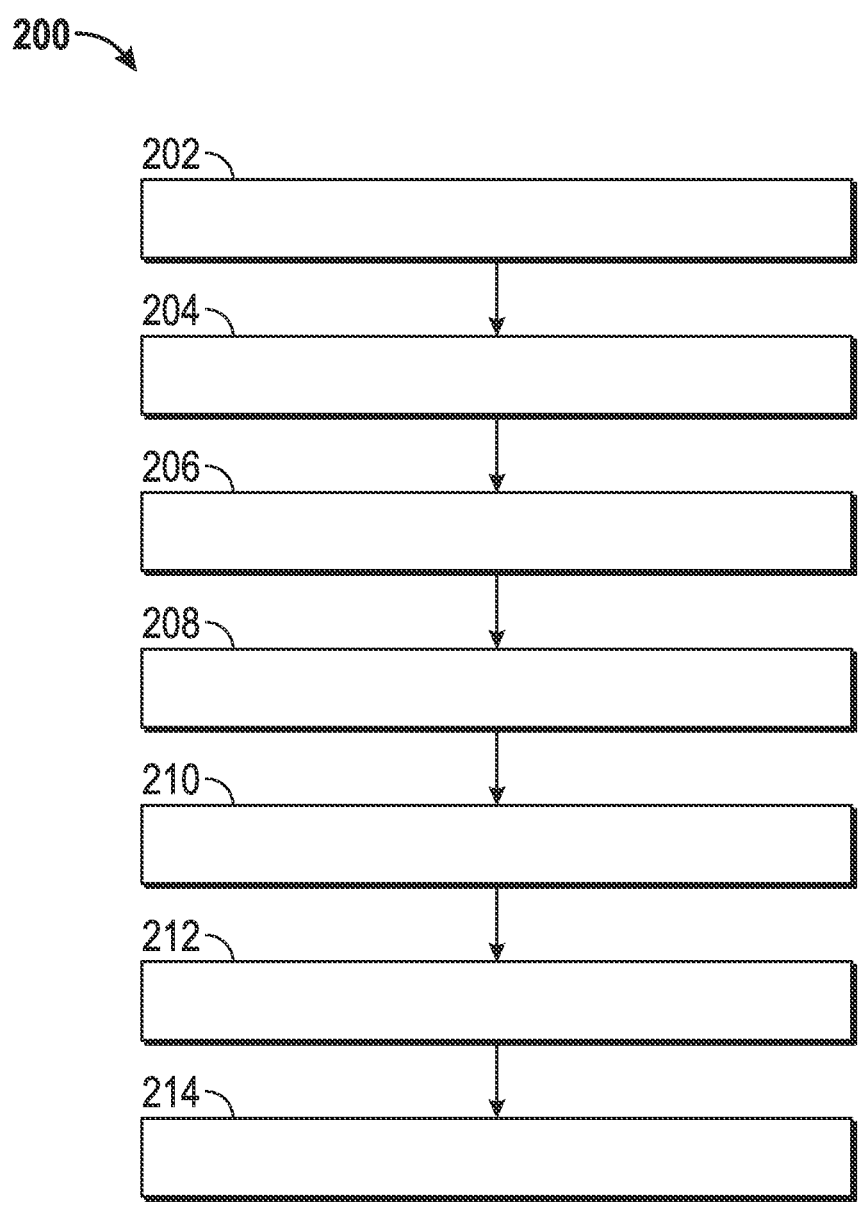
FIG. 29 is a flow diagram illustrating a method of assembling the front end assembly.

A method of assembling a front end assembly of a vehicle 100 is also provided as illustrated in FIG. 29 and with reference to FIGS. 1-28. The vehicle 12, and more specifically the front end assembly 10 have been previously described and specific structural components need not be described in further detail. The method of assembling a front end assembly of a vehicle 100 includes integrally forming 202 the positioning and reinforcement structure 30 having a relatively rectilinear configuration comprising the top support member 32, the bottom support member 34, the first side member 36 and the second side member 38. The first wing structure 70 and the second wing structure 72 are detachably coupled 204 to the first side member 38 and the first fender assembly 76 is operably mounted 206 to a first side flange 74 of the first wing structure 70. The centering bracket 110 is operably coupled 208 proximate the top support member 32 and includes the hood locating aperture 112 configured to receive the centering pin 114. The positioning and reinforcement structure 30 is located and centered 210 to the hood 118 upon insertion of the centering pin 114 into the hood locating aperture 112. The positioning and reinforcement structure 30 is fixedly secured 214 to the radiator support 60, which is disposed rearwardly of the positioning and reinforcement structure 30.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of assembling a front end assembly of a vehicle comprising:
   integrally forming a positioning and reinforcement structure having a relatively rectilinear configuration comprising a top support member, a bottom support member, a first side member and a second side member;
   detachably coupling a first wing structure to the first side member;
   operably mounting a first fender assembly to a first side flange of the first wing structure;
   operably coupling a centering bracket proximate the top support member;
   locating and centering the positioning and reinforcement structure to a hood with the centering bracket; and
   fixedly securing the positioning and reinforcement structure to a radiator support disposed rearwardly of the positioning and reinforcement structure.

2. The method of claim 1, further comprising operably coupling at least one automotive component to a plurality of locating and attachment components disposed on the positioning and reinforcement structure.

3. The method of claim 2, wherein the at least one automotive component comprises a headlamp assembly, a bumper or a grill.

4. The method of claim 1, further comprising aligning and mounting an aft end of the first fender assembly to a region proximate a front region of a vehicle door.

5. The method of claim 4, further comprising attaching a fender mount bracket proximate the aft end of the first fender assembly, wherein the fender mount bracket is mechanically fastened to the region proximate the front region of the vehicle door.

6. The method of claim 1, further comprising attaching a fender flange proximate the fore end of the first fender assembly, wherein operably mounting the first fender assembly to the first side flange comprises engaging one or more apertures disposed within the fender flange over at least one pin extending forwardly from the first side flange.

7. The method of claim 6, further comprising mechanically fastening the fender flange to the radiator support.

8. The method of claim 1, further comprising operably coupling at least one brace to the positioning and reinforcement structure, wherein the at least one brace is fixedly secured to the top support member.

9. The method of claim 8, further comprising mounting the centering bracket on the at least one brace proximate the top support member.

10. The method of claim 8, further comprising mounting a latch assembly to at least one of the top support member and the at least one brace.

* * * * *